US011044888B2

(12) United States Patent
Hagen et al.

(10) Patent No.: US 11,044,888 B2
(45) Date of Patent: Jun. 29, 2021

(54) APPARATUS FOR REJECTION / CONTROL OF PESTS FOR AREAS, AND THE USE THEREOF

(71) Applicant: TX Guardian AS, Oppaker (NO)

(72) Inventors: Ole-Einar Hagen, Oppaker (NO); Vidar Henrichs, Arnes (NO)

(73) Assignee: TX Guardian AS, Skarnes (NO)

( * ) Notice: Subject to any disclaimer, the term of this patent is extended or adjusted under 35 U.S.C. 154(b) by 859 days.

(21) Appl. No.: 15/731,242

(22) PCT Filed: Nov. 6, 2015

(86) PCT No.: PCT/NO2015/050207
§ 371 (c)(1),
(2) Date: May 5, 2017

(87) PCT Pub. No.: WO2016/072862
PCT Pub. Date: May 12, 2016

(65) Prior Publication Data
US 2018/0070556 A1   Mar. 15, 2018

(30) Foreign Application Priority Data

Nov. 6, 2014   (NO) .................................. 20141322

(51) Int. Cl.
*A01K 61/60*   (2017.01)
*A01K 3/00*   (2006.01)
(Continued)

(52) U.S. Cl.
CPC .............. *A01K 3/005* (2013.01); *A01K 61/60* (2017.01); *A01K 79/02* (2013.01); *A01M 1/22* (2013.01);
(Continued)

(58) Field of Classification Search
USPC ........................................................ 361/232
See application file for complete search history.

(56) References Cited

U.S. PATENT DOCUMENTS

| 2,401,815 A | * | 6/1946 | Dalziel | ..................... H05C 1/06 307/327 |
| 4,316,232 A | * | 2/1982 | Phillips | ..................... H05C 1/04 256/10 |

(Continued)

FOREIGN PATENT DOCUMENTS

| AU | 199920354 | 9/2000 |
| DE | 20106256 U1 | 10/2001 |

(Continued)

OTHER PUBLICATIONS

International Search Report and Written Opinion prepared by European Patent Office for PCT application No. PCT/NO2015/050207, of which the present application is the US National Stage. Mar. 2016.

(Continued)

*Primary Examiner* — Danny Nguyen
(74) *Attorney, Agent, or Firm* — Bresbo AB

(57) ABSTRACT

It is disclosed a device for controlling and/or euthanizing vermin or pests for preventing such vermin or pests from entering into a geographical area or into a building, wherein the device comprises at least one completely or partially uninsulated electrically conducting wire or conductor connected to an electrical current source, providing controlled electrical pulses to said conductor or wire in the form of pulses or pulse trains. The device may be used in a method for controlling the access of pests/vermin to a geographical location, building or property wherein the electrically conducting wire(s) lead(s) an electrical current with an amperage of not less than 0.0001 A. The device and method is (Continued)

particularly suited for removing/controlling pests/vermin on land.

9 Claims, 16 Drawing Sheets

(51) Int. Cl.
  *A01M 19/00* (2006.01)
  *A01M 29/26* (2011.01)
  *A01M 29/28* (2011.01)
  *A01K 79/02* (2006.01)
  *A01M 1/22* (2006.01)
  *A01M 1/24* (2006.01)
  *A01M 29/24* (2011.01)

(52) U.S. Cl.
  CPC .............. *A01M 1/24* (2013.01); *A01M 19/00* (2013.01); *A01M 29/24* (2013.01); *A01M 29/26* (2013.01); *A01M 29/28* (2013.01); *Y02A 40/81* (2018.01)

(56) References Cited

U.S. PATENT DOCUMENTS

| | | | |
|---|---|---|---|
| 6,314,914 B1 | 11/2001 | Betzen | |
| 6,371,054 B1 | 4/2002 | Celata et al. | |
| 6,450,483 B1 | 9/2002 | Baum | |
| 7,191,735 B2 | 3/2007 | Wolfgram | |
| 7,481,021 B2 * | 1/2009 | Riddell | A01M 29/26 43/1 |
| 2003/0151410 A1 * | 8/2003 | Hamm | H05C 3/00 324/509 |
| 2005/0132635 A1 | 6/2005 | Riddell | |
| 2005/0231885 A1 | 10/2005 | Wolfgram | |
| 2006/0143974 A1 | 7/2006 | Pollmann | |
| 2008/0079316 A1 * | 4/2008 | Wolfgram | H05C 1/04 307/106 |
| 2009/0126651 A1 | 5/2009 | Riddell | |
| 2010/0148592 A1 * | 6/2010 | Hamm | H05C 1/04 307/326 |
| 2011/0214339 A1 | 9/2011 | Donoho | |
| 2013/0026432 A1 * | 1/2013 | Horvat | A01M 29/24 256/10 |
| 2014/0053788 A1 | 2/2014 | Riddell | |
| 2014/0264217 A1 | 9/2014 | Callahan | |
| 2015/0282471 A1 * | 10/2015 | Lampman | A01K 3/002 119/712 |

FOREIGN PATENT DOCUMENTS

| | | |
|---|---|---|
| DE | 201 06 256 | 11/2001 |
| DK | 127943 | 8/1975 |
| DK | 200700224 | 12/2008 |
| EP | 2 119 351 | 11/2009 |
| EP | 2 119 351 A2 | 11/2009 |
| SE | 529271 | 6/2007 |
| WO | WO 93/20689 | 10/1993 |
| WO | WO 95/08915 | 4/1995 |
| WO | WO 00/11944 | 3/2000 |
| WO | WO 0018224 | 4/2000 |
| WO | WO 2004/021780 | 3/2004 |
| WO | WO 2004/021780 A1 | 3/2004 |
| WO | WO 2014/054951 | 4/2014 |
| WO | WO 2014/054951 A1 | 4/2014 |

OTHER PUBLICATIONS

International Preliminary Report on Patentability for PCT/NO2015/050207, of which the present application is the US National Stage. dated Feb. 2017.
Response to Office action received from Australian patent office in copending application No. 2015343804.
Notice of Acceptance received from Australian patent office in copending application No. 2015343804, including cited references.
Office Action received from the Norwegian Patent Office for Norwegian Patent Application No. 20141322, which is the priority application for the present application.
Office action received from Australian patent office in copending application No. 2015343804.
Response pursuant to Rule 161 EPC in copending European Patent Application No. 15813141.7.
U.S. Appl. No. 15/524,627.
International Search Report and Written Opinion for PCT/NO2015/050207 dated Mar. 15, 2016, 10 pages.
International Preliminary Report on Patentability for PCT/NO2015/050207 completed Feb. 13, 2017, 17 pages.
Norwegian Search Report for application No. 20141322 dated Apr. 20, 2015, 3 pages.
Office action issued by European Patent Office in copending European application No. 15 813 141.7, dated Jan. 2021.
Office Action issued by the Chinese Patent Office in copending application No. 201580072227.X, dated Nov. 2020.
English translation of the previously disclosed Office Action that was ssued by the Chinese Patent Office in copending application No. 201580072227.X, dated Nov. 2020

* cited by examiner

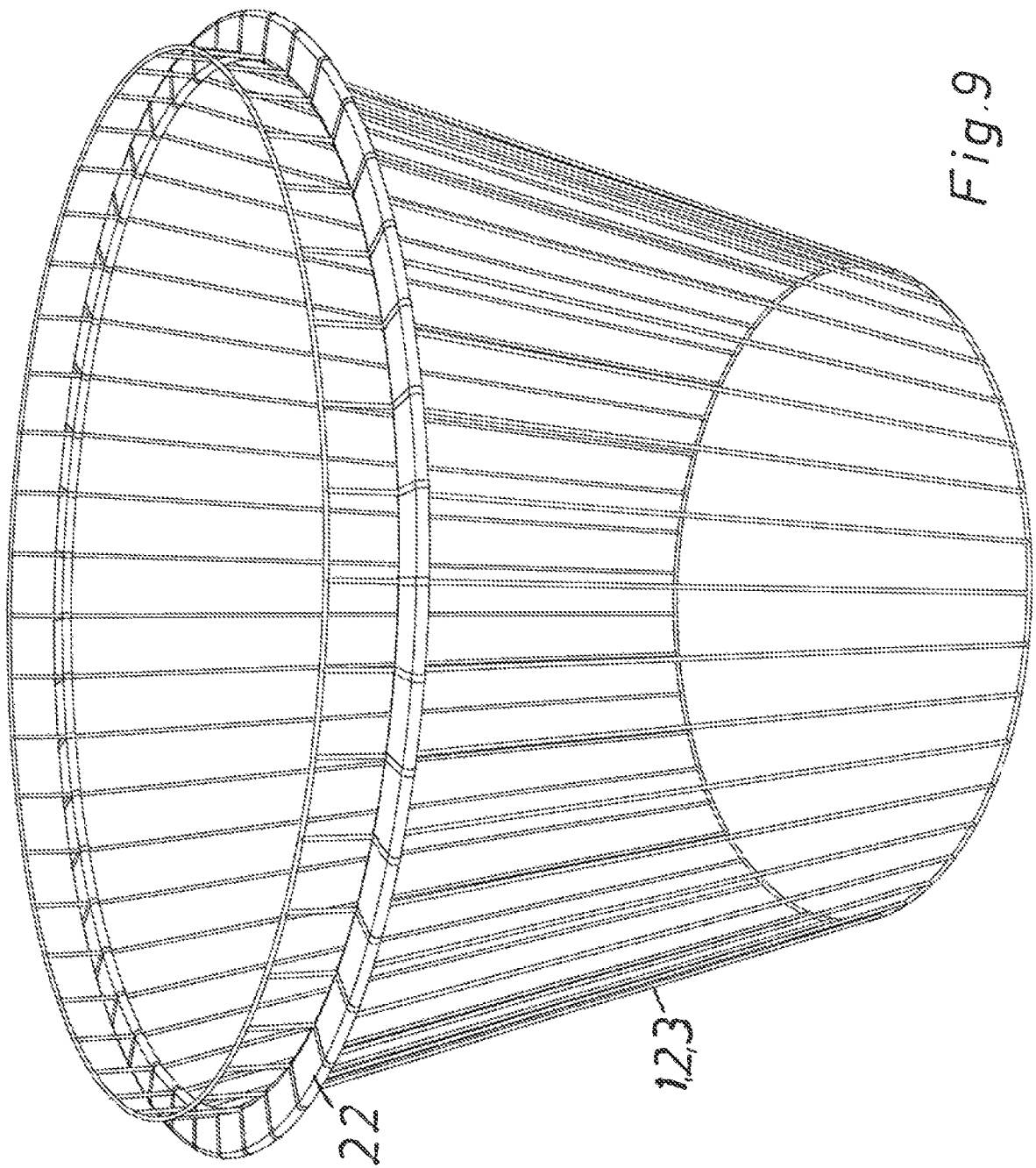

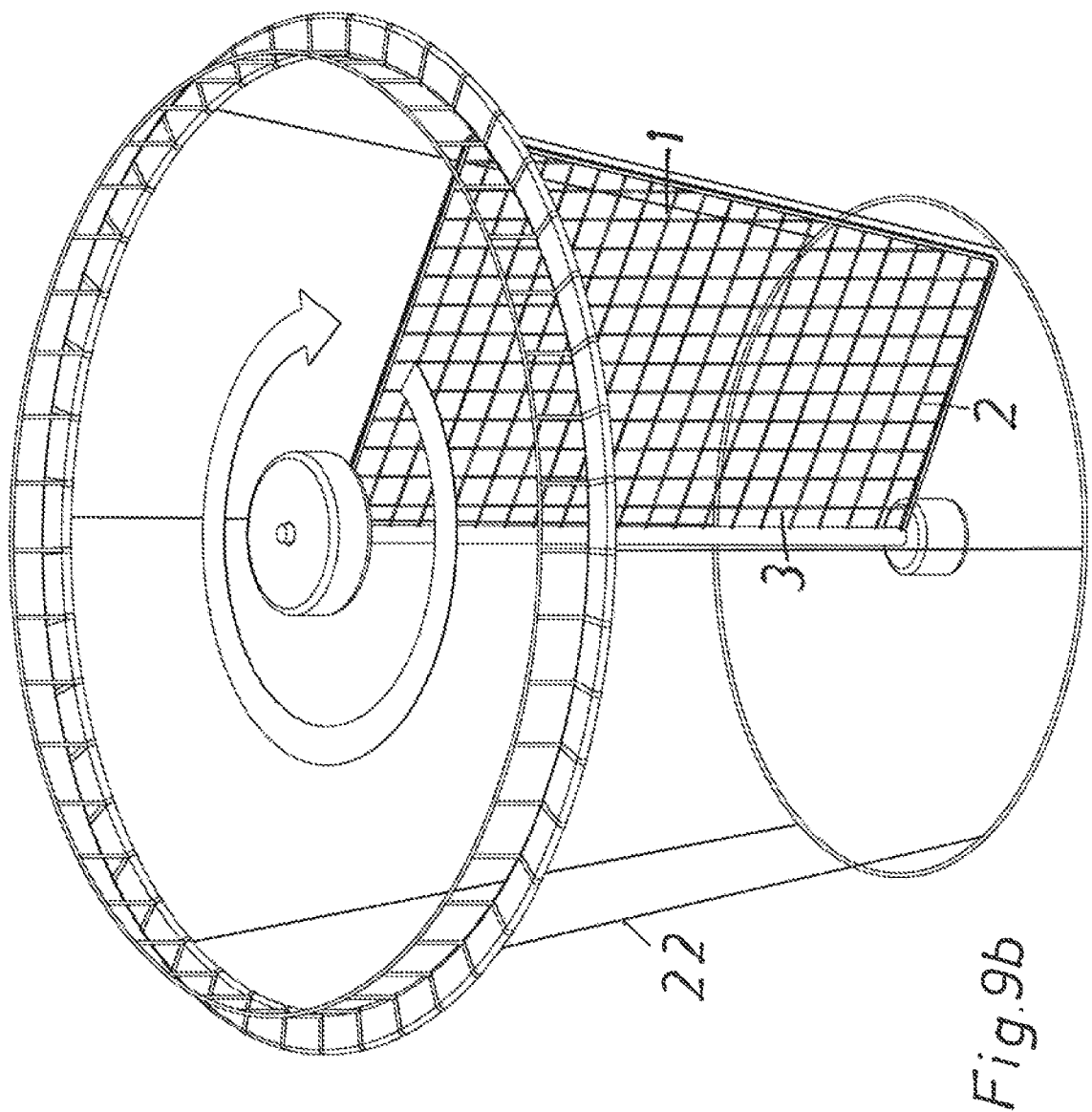

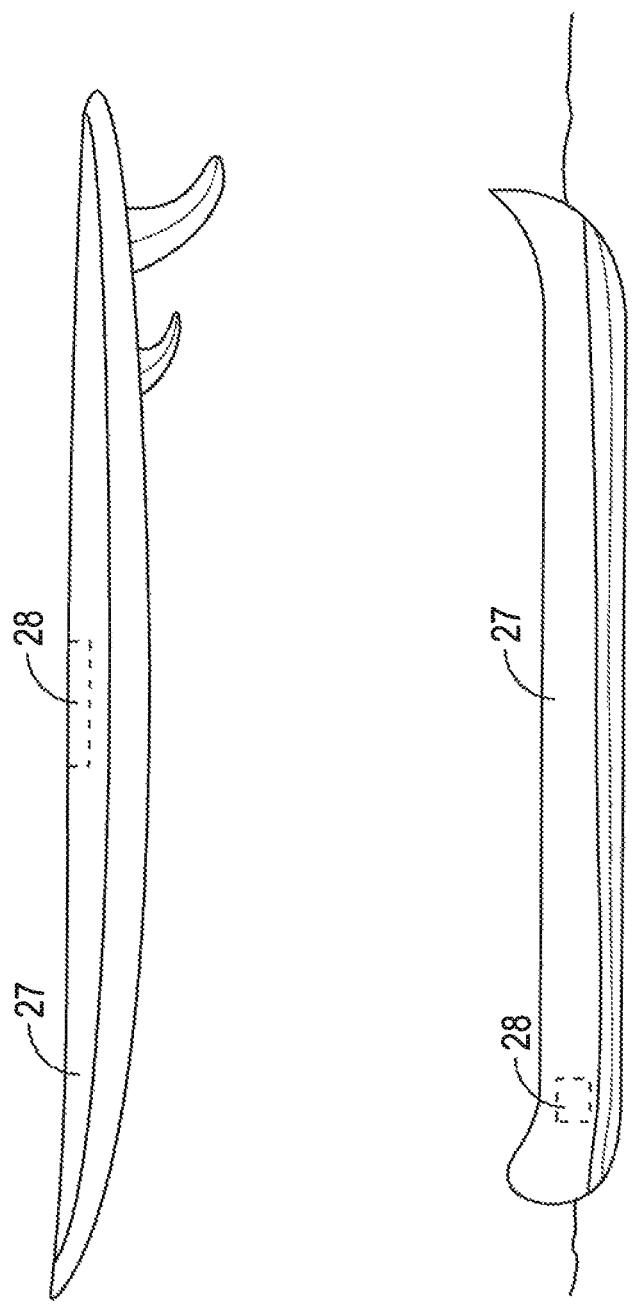
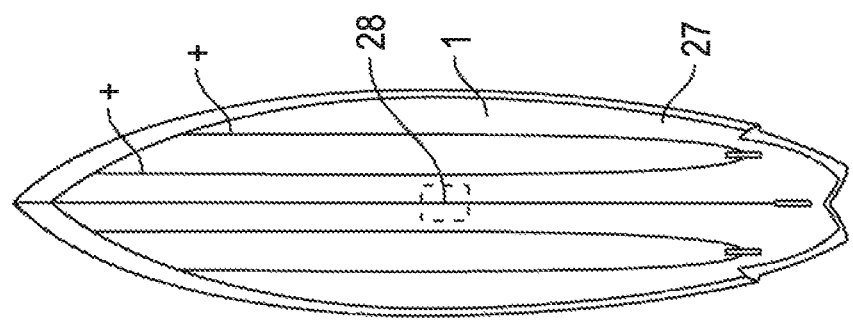
FIG. 13

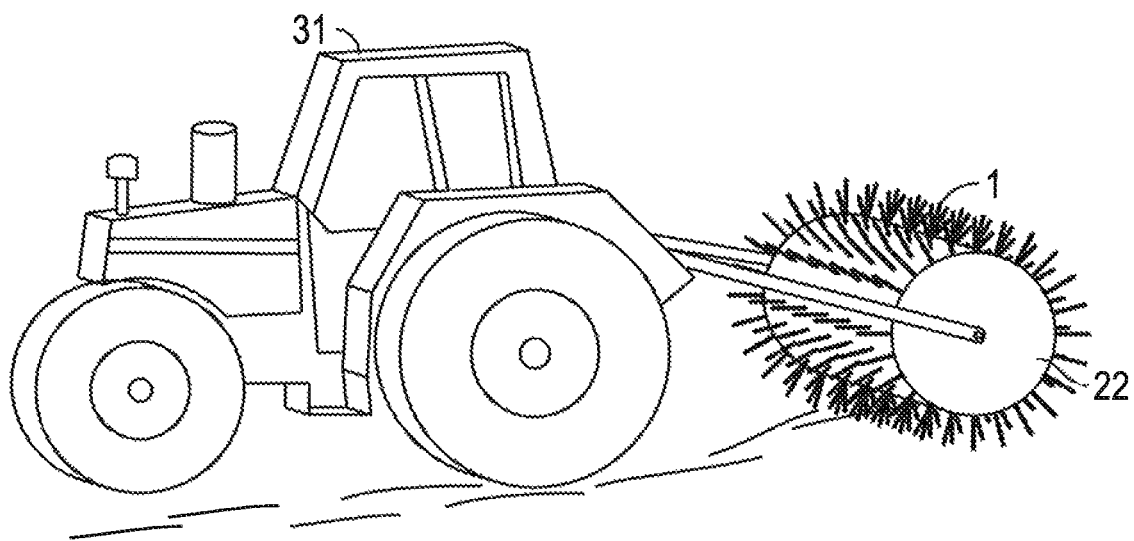
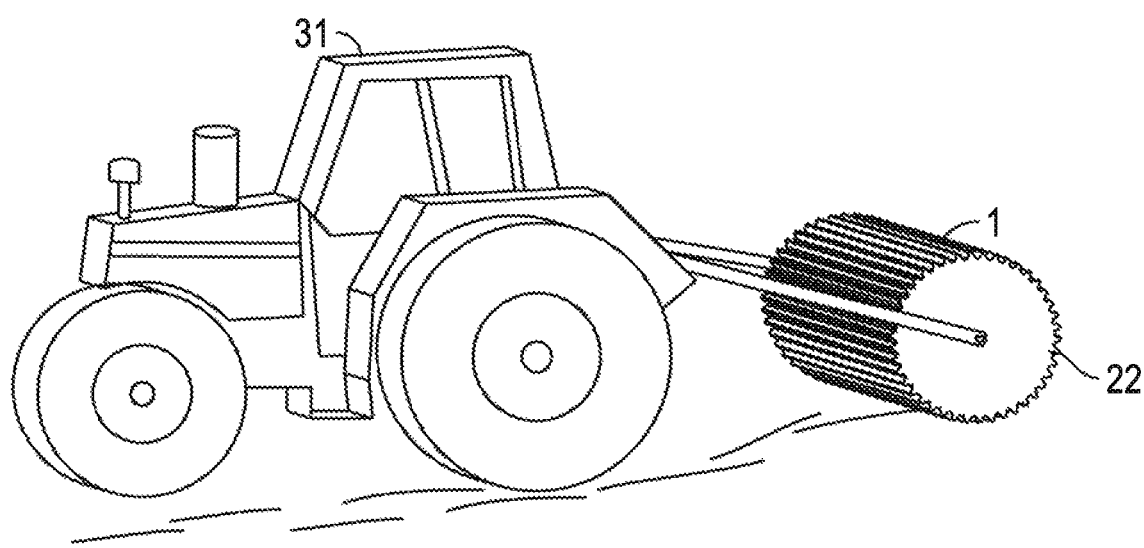
FIG. 16

APPARATUS FOR REJECTION / CONTROL OF PESTS FOR AREAS, AND THE USE THEREOF

RELATED APPLICATIONS

This application is a 35 U.S.C. § 371 national stage application of PCT Application No. PCT/NO2015/050207, filed on Nov. 6, 2015, which claims priority from Norwegian Application No. 20141322, filed Nov. 6, 2014, the contents of each of which are incorporated herein by reference in their entireties.

AMBIT OF THE INVENTION

The instant invention relates to a device or system for the rejection/dismissal/control/disposal of pests and/or vermin invading geographical and other areas, the device comprising a power source and where this power source is connected to a number of at least locally insulated current conducting wires, said power source being an electrical generator or battery connected to said at least one electrically conducting line(s) or wire(s), wherein the electrical line(s) or wire(s) is/are mounted to an object at land or sea, wherein electrical current is supplied to said line(s) or wire(s) for providing an electrical current conducted through any organism short-circuiting an electrical circuit formed by said electrically conducting line(s) or wire(s). When the device/system is located on land, said electrically conducting line(s)/wire(s) is/are located at a height above the ground or flush with the ground or even below the ground to form an electrically conductive barrier or field protecting against the ingress of vermin to said area. The electrically conducting line(s) is/are at least partially isolated, and energized power lines are installed above ground. It is preferred that the electrically conducting lines are located at a distance of at least 1 cm above the ground level. The invention also relates to a method for optimizing power transfer and power adjustment in such a device to be optimally fit for the rejection/dismissal of the pests/vermin in question, and the use of such a device for the rejection/control/disposal of pests penetrating and damaging an area or devices within said area.

BACKGROUND FOR THE INVENTION

Pests and vermin in the form of rodents (mice, rats, rabbits, etc.), insects (cockroaches, beetles, ants, termites, mosquitoes, moths, wasps, scorpions, etc.), arachnoid (spiders), multi therapists (centipedes, scolopenders), mollusks/nematodes (snails, etc.), birds (pigeons, gulls, crows, etc.), reptiles (snakes, geckos, etc.), other pests such as martens, weasels, raccoons, gophers, etc. as well as animals that can attack people such as hyenas, tigers, lions, bears, wolves, wild boar, etc. can do great damage to crops, breeding farms, buildings, warehouses, installations etc. and they may carry diseases or increase fear of going out. Many people residing or working inside buildings and installations such as food stocks, grain storages, transport vessels (ships, cars, airplanes) etc. may also be vulnerable to attack, or the residence of such pests can damage the stored material (food, grain, etc.), the inventory of installations (furniture, electrical wires, etc.) or even the installations themselves (wooden beams (bearing or frame), insulation, etc.) are liable to become damaged. It is therefore of importance that such pests are prevented from having access to such sites, buildings and installations.

In addition, and partly because of the risk of infection or diseases that these animals may carry or because of the potential damage such animals may do, it may also be desirable to euthanize such animals in certain areas. For example, it may be desirable to reduce or eliminate strains of rats that may reside in sewage plants in cities.

Also in the control of insect pests (cockroaches, carpenter ants, termites, etc.) it may be necessary to kill the pests rather than just preventing their access to an area (pantry, food storage, kitchen, etc.). Also larger rodents such as moles or gophers can cause harm to crops such as carrots, turnips, potatoes, cabbage, etc. and it is also desirable to keep such animals away from the relevant crop (at least until it is harvested). A further example can be snails (e.g. Iberia-snails/brown snails) that can multiply to large numbers and do great damage, for example ornamental plants and crops.

In the shipping business it is also wanted an alternative to toxic bottom coatings for preventing or controlling the growth of shells or other aquatic organisms to the hulls of boats, partly on account of such organisms representing a drag on the progression of the ship's hull through the water, and additionally on account of the biohazard such organisms may represent if they are liberated into environments there they do not have any natural enemies.

On particular marine area that is of relevance to the device according to the present invention is in cultivating and breeding cages or nets within the fish breeding business.

Cultivated or bred salmonides such as Atlantic salmon (Salmo salar), trout such as rainbow trout are frequently infested by parasitic crustaceans called salmon lice. These parasites attack the salmonides in the cultivating or breeding pen or net, and eat the flesh of the fish and thereby killing them or at least reducing their resistance to e.g. infections thereby causing great damage to the farmed fish. One of the methods that has been used for controlling such infestations of salmon lice is by supplying poison to the water in and around the farming pens or nets. The normally used compounds for controlling the infestation of salmon lice to fish farming facilities are, however, also toxic and carcinogenic to humans, and an alternative to this method is consequently urgently searched for.

PRIOR ART

Previously, it was customary to kill the relevant pests. For example, it has been and it is still common to add mouse and rat poison to accessible cages for removing mice and rats from e.g. residential areas. The disadvantage of this practice is that animals other than those which are considered to be the appropriate pests, may ingest such poison either directly or indirectly by eating the poisoned vermin that they catch. For example, pets such as dogs and cats or other beneficial animals such as hedgehogs or small birds may ingest such poisons and thus die, which could aggravate any pest nuisance (e.g. by removing cats that hunt and kill rodents from an environment when they accidentally consume such deployed poison).

Another aspect of controlling pests is that animals considered by humans to be vermin and pests, usually occur within a natural environment, a so-called biotope. By way of example, removing rodents from a natural area, will simultaneously remove the food consumption basis for predators within the same area. This could have as a consequence that the wild animals/predators lose their life due to human intervention thus upsetting the natural balance in the relevant biotope.

Consequently, it is an aspect of the present invention to provide a control device for such vermin/pests where the use of such a control device does not unduly distort or disturb such a natural balance in a biotope.

A prior art device which intends to prevent pests from entering homes, is an electrical generator of ultrasonic sound waves where the ultrasound is perceived as uncomfortable or intimidating to pests, and where the ultrasound is produced in a frequency range that can not be heard by humans. However, a disadvantage of such generators is that the sound being generated, in time is no longer perceived by the pests as sufficiently uncomfortable or scary because the relevant vermin/pests get used to the sound over time and/or discover that there are no negative consequences to themselves when the sound is heard.

It is also known a number of mechanical mouse and rat traps where the animals are lured to the traps using a snack that is attached to the trap, and the trap is triggered mechanically and by a release mechanism associated with the food which is activated when the food is touched so that the trap is triggered when the animal is attempting to obtain the snack/food, or the trap is connected to a mechanical or electrical trigger that is activated when the animal steps on the trigger or is recorded to be near the trap. Such mechanical traps are, however, all exclusively aimed at killing the animals.

Regarding insects, there are devices which rely on the fact that many insects (mosquitoes, moths, etc.) are attracted by light and heat (many insects perceive and are attracted by emitted light in the infrared spectrum), so that they will fly to any such light source. By connecting the light source to, for example, an energized wire mesh, the insects will be killed when they fly toward the light source. Such devices are however not intended for rejection/control of such and other vermin/pests that do not fly (ants, snails, mollusks (water), etc.) or larger pests such as mammals (rodents and larger animals).

It is further from WO 2004 21780, U.S. Pat. Nos. 4,165,577 and 6,223,464 known devices utilizing live wires to kill ants/termites, in which two electrically conductive wires are brought together in close distance to each other under an overhang where the ants are forced to travel up the overhang and thus coming into contact with the electrical wires so as to be killed through an electrical shock/electrocution.

U.S. Pat. No. 5,007,196 discloses an apparatus which utilizes electrical conductors and wherein the apparatus is designed to kill insects. In such an arrangement there is used, however, very low amperage and voltage so that this device is not intended for larger animals such as reptiles (snakes geckos, etc.) and rodents (rats, mice, moles, etc.).

Also in U.S. Pat. No. 5,435,096 there is disclosed the use of electrical power to kill nematodes and arthropods and especially ants and termites. In such an arrangement there is used phase-locked high voltage where neither the voltage nor amperage are varied appreciably, and such devices are not intended for rejecting larger animals such as rodents or reptiles.

In U.S. Pat. No. 3,366,854 there is described an electrical device for rejecting birds. Here the electricity is entered in lines located in a landing spinner for the birds, and the birds get shocked if they touch the landing pins in the landing spinner so that contact occurs between the wires through the birds' toes. Such a device is not intended for insects, rodents or reptiles.

There exists consequently a need for a device which can reject or expel pests/vermin of any size and wherein the effect of such a device does not decrease with time and which, in one embodiment, does not harm the animals concerned so that the balance in the surrounding biotope of the device is not unduly disturbed. There is also a need for a device in which electricity can be controlled so that it can be adapted to the size of the relevant pest/vermin and to the type of animal that is to be expelled/rejected/dismissed. At least such a function is considered to represent an improvement over the prior art devices.

It is previously known electric fence devices comprising a plurality of vertical rods/fence posts between which rods/fence posts there are drawn electrically conducting cables, where touching these wires causes an electrical shock to the individual that touches the wires. Such fences are widely used in the outfield or infield to safeguard horses, cows, sheep or goats within the relevant enclosed geographical area e.g. a training area (horses) or a grazing area (cows) or simply a storage area for animals.

Unlike the device according to the present invention those previously known electrically conductive enclosures are arranged to keep the relevant live animals inside a region and are not intended to keep pests outside of said region, nor are such prior art devices meant for other types of animals than larger ones (horses, cows, pigs, bulls, etc. normally of a weight exceeding about 1 kg) so that the height that the electrical lines above ground level is far higher than the height of the wires in the device according to the present invention. The current flow in the wires in such live fences is the addition of fixed voltage and amperage, and is not intended to be altered or differ in any way. For these reasons, non-electrically powered fencing, as is used and designed currently, is suitable as a foundation for placing the electrical wiring, according to the present invention, as will be explained further below.

GENERAL DESCRIPTION OF THE INVENTION

The present invention relates to a device of the kind defined in claim 1. The invention further relates to a method of using the device by regulating the current in such devices to achieve optimal efficacy of such devices as defined by the user of the device as well as the use of such a device to keep pests/vermin outside a geographical area.

For a living being to perceive it getting an electric shock (deterrent or killed), it must in some way short out or complete an electrical circuit. This can be achieved principally in three ways. One way is wherein the electrical current is passed via an (un-insulated) wire said wire being located/mounted so that it does not touch or is isolated from contact with the ground, and where the current is passed to ground if there is achieved contact between the wire and the ground. If an animal causes said electrical connection/short circuit by the animal standing on the ground, particularly when the ground is in such a state that it conducts electricity, for example when being wet or damp, and simultaneously touching the wire, the animal will short out said electrical circuit by grounding between the electrified wire and the ground via the individual touching the wire, and thereby getting an electric shock.

The second way that a living being may perceive getting an electric shock, is by said individual shorting out a circuit by touching two energized and bare wires simultaneously. If this happens, the animal will act as a leader or a "circuit breaker" that short-circuits the current circuit.

The third way in which a subject can perceive an electrical shock, is if the individual is located in a high-voltage electric field and where the individual shortens the distance between the poles of the electric field by their existence therein. This can be exemplified by what happens in a thunderstorm where lightning usually strikes between electrically and oppositely charged clouds and/or the highest point on the ground situated below the charged cloud (the condenser principle).

Electrical power passed through an individual may be dangerous and is perceived as uncomfortable for different reasons. Animals and people with a nervous system, where nerve impulses are conducted in nerve pathways as current impulses, are susceptible to externally applied electrical power. Externally supplied electrical power may overstimulate nerves allowing nerve impulses to muscles to be overcome. This leads to "nerve signals" so that the muscle contracts continuously and the muscle goes into a spasm-like state (rigor) as long as external power is applied. This is fatal to mammals if nerve impulses to the heart are overridden so that the heart goes into such a cramp-like state and stops pumping blood to the brain and other vital organs. Even if electrical power is not passed through the heart, said cramp-like condition of the muscles is perceived as unpleasant and frightening.

For animals the size of a human to be killed with electrical power, the animal is to complete an electrical circuit through the animal/human where current is conducted through the heart and wherein the amperage exceeds about 100 milliamperes (mA). Minimum lethal amperage for humans is normally within the range of 100-300 mA. Voltage is in this context not of major importance, as an individual may well survive a shock with a voltage of several thousand volts as long as the amperage is not particularly large (under the above amperage of 100 mA, for example, less than 10 mA or less than 5 mA, such as within the range of 1 to 10 mA or 5-10 mA). For humans, a current level that is within the range of 1-5 mA is hardly noticed. Nevertheless, current levels within this range are applicable to be used in the device of the present invention, since this device is intended to differentiate between smaller organisms (rodents, insects, etc.) and organisms with different surface states (e.g. snails) that are much more sensitive to electricity.

The above current intervals refer to direct current. AC (alternating current) is perceived much more intensely since the polarization in such AC current is alternating continuously. Within a commercial power network for example using a voltage of 110-220 V, it is standard to use an alternating current of about 50-60 Hz, i.e. the polarity of the electrical power switches 50 to 60 times per second. If such a current is passed through a mammal with a nervous system, the muscle contractions caused by the alternating current also vary accordingly, which is perceived as the muscle contractions being completely out of control (which they are).

Both voltage and frequency in commercial facilities in the individual countries may vary. Common commercial power grids used is normally a voltage of 110 or 220 V AC at a frequency of 50-60 Hz, however other voltages and frequencies (if AC) may be used in the device and method of the present invention. The voltage used in the apparatus of the invention may vary depending on the type of device in question also from a practical perspective. If a condenser principle is used for deterring vermin from entering an area (see above), it may be appropriate to apply a voltage of several thousand volts down to 1.5 V (eg. 50,000 V and lower, e.g. 40,000 V, 30,000 V, 20,000 V, 18,000 V, 17,000 V, 16,000 V, 15,000 V, 14,000 V, 13,000 V, 12,000 V, 11,000 V, 10,000, 9,000 V, 8,000 V, 7,000 V, 6,000 V, 5,000 V, 4,000 V, 3,000 V, 2,000 V, 1,000 V and down to the commercial voltage of 400 V, 220 V and 110 V, or lower such as 100 V, 86 V, 64 V, 52 V, 40 V, 36 V, 24 V, 12 V, 6 V).

Regarding humans a current of AC type with a voltage of 220 V, an amperage of 60-100 mA and a frequency of 60 Hz will normally be fatal, while DC under the same conditions would have to be of a current of 300-500 mA to be fatal to humans.

Another form of damage is tissue damage caused by current being passed through tissue, thereby giving rise to so-called electroporation of cell membranes in the tissues exposed to the current. Such damage occurs at the cellular level and causes injury by the cells in that particular tissue dying. Such tissue damage may later also be the cause of secondary damage by dead tissue being attacked and/or consumed by bacteria and viruses. Damage by electroporation can be particularly relevant for organisms with high water content and with a moist surface such as snails.

Due to the electrical resistance in electrical conductors the electrical conductors will become heated when thy conduct electricity. This has to be taken into account when designing the circuit and determining the amperage and voltage to be used in the relevant device.

In view of the current in the device of the present invention in an embodiment and in most cases not being intended to kill animals, but instead deter them from entering an area, the amperage carried in the electric wires which animals can touch in such an embodiment, form a voltage within the above unpleasant, but not lethal intervals. Based on Ohm's Law ($U=RI$, wherein U represents the voltage, R represents the electrical resistance and I represents the amperage of a current carried in the relevant electrically conducting wire), the voltage will vary linearly with the amperage in an electrical wire with a fixed electrical resistance. Thus it is possible to vary the voltage by varying the amperage in any given electrically conducting wire with a fixed electrical resistance, and vise versa.

Also the touching of electrified objects by the relevant animal is of importance when it comes to whether the animal shall be killed or frightened. Touching a live power line and the ground or two live wires at the same time, where the bearing points are situated in different ends of the individual (e.g. forelegs and hind legs) will normally pass current through the whole body of the animal (which may have as a result that e.g. the heart of the animal stops). However, touching two live wires with two fingers or toes will not send current through the animal systemically, but only between the parts that touch the wires. This may be used if the device according to the invention is to deter birds from landing on a particular area, the area then being covered with live wires or mesh so that the birds will touch at least two wires at the same time when they land. This will be experienced by the relevant bird as a shock to the toes, but will not normally kill the animal since the current does not run through the animal's organs.

In another embodiment, it is taken into account the nature of the animals to control/euthanize. Animals with a dry surface and which are relatively large (e.g. predators such as bears, wolves, hyenas, lions, etc. or reptiles, e.g. snakes) can tolerate larger electrical currents than smaller animals with a moist surface (e.g. nematodes/snails) or smaller animals with electrically conductive exoskeletons (insects such as ants, termites, crickets, etc.). In one embodiment, it is appropriate to regulate the electrical current and/or voltage in the electrically conducting wires. This can be done by, for example. to include a converter/transformer in the current circuit and/or provide an adjustable resistance. Based on the general Ohm's Law ($U=RI$, where U is the voltage in the circuit in volts, R is the electrical resistance of the circuit in ohms and I is the amperage in the electrical circuit in Ampere), the voltage in a circuit can be controlled by regulating the resistance as long as the current strength in the circuit is constant or the amperage of a circuit can be varied by means of the resistor if the voltage is constant.

The reason that damage with electrical power often is associated with high voltage, is precisely that at constant resistance, a high voltage also indicate a high amperage (also from Ohm's law). The amperage of a circuit is related to the number of free electrons that can be transported in the circuit, where the electrons runs from negative to positive pole, while the current runs in the opposite direction (i.e. from positive to negative pole). The ability of a material to act as an electrical insulator or electrical conductor is due to the material's ability to supply the electric circuit with free electrons. Metals with free electrons in a metallic molecular structure or lattice and liquids with positively and negatively charged ions (e.g. water with a dissolved salt or a liquid medium with a dissolved salt) are normally good electrical conductors. Since air is considered to be a good insulator since the main components of air (mainly molecular oxygen, molecular nitrogen and a small amount of carbon dioxide) do not possess or emit with difficulty free electrons, having as a consequence that there may exist an electric field between the two poles of an air-filled space where between the poles there does not exist a material with the ability to supply free electrons and thereby not giving rise to an electric current. The voltage of such a field may be high (see supra), but will not be harmful or fatal because there initially does not run any electrons between the poles. The ability to pass a current in such a capacitor depends on the distance between the capacitor plates and this ability increases or decreases proportionally with the square of the distance between the capacitor plates. If an electrical conductor is placed between the poles in such an electrical field, wherein the electrical conductor has the ability to provide free electrons, the distance between the capacitor plates is reduced and a current will run through the conductor of a strength associated with the conductor's ability to supply free electrons. If the conductor is e.g. an animal, the animal need not be killed by placing it in an electric field of such a circuit, based on the animal's ability to pass free electrons between the electrical poles. This allows devices of this invention to utilize electric fields between the electric conductors as well as current-carrying wires, since an electrical field is equally suited to scare animals if the animal completes the electric circuit by its mere presence between the electrical poles of the electrical field.

The current used in the apparatus of the present invention may be direct current (DC) or alternating current (AC), depending on the power source. If the electrical power originates from a commercial power grid or local alternator/emergency unit, the power will be of AC type, while it will be of a direct current type (DC) if it originates from e.g. a battery or a solar panel. Alternating (AC) current can also be converted to DC power using a rectifier. As source of DC power it may be used batteries singly or batteries connected to each other in parallel or series. It can for example be used a battery or batteries voltage of 1.5V, 9 V, 12 V or 24 V.

The electrically conducting wires may also be connected in an electrical circuit in parallel or in series. The wiring has an impact on the workings of the external circuit of the device according to the invention. If a number of non-insulated or partially insulated electrical conductors are connected in parallel the voltage over the parallel circuit parts will obtain a value being equal in each of the branches of the parallel, whereas the total amperage in the parallel connected section of the circuit will equal the sum of the amperages in each of the branches of the parallel section ($I=i_1+i_2+\ldots+i_n$ wherein I represents the total amperage of the parallel circuit consisting of n branches and $i_n$ represents the amperage in the $n^{th}$ branch of the circuit, wherein n is an integer representing the number of the relevant branch of the parallel section) and the inverse of thee total resistance of the parallel section will equal the sum of the inverse of each resistor in the parallel section ($1/R=1/r_1+1/r_2+\ldots 1/r_n$ wherein R represents the total electrical resistance (in Ohms) of the parallel section and $r_n$ represents the electrical resistance in the $n^{th}$ branch of the parallel section, wherein n represents an integer). These relationships may be used to advantage when designing and connecting the sections forming the circuits of the device according to the invention.

The electrical power transmitted through the circuit(s) in the apparatus of the present invention may in one embodiment be constant or may, in another embodiment, be variable. If the perceived effect of the power is to work more strongly on the individual that touches the respective electrical wires (and thereby shorting out said circuit), the current flow is in one embodiment sent through wires in the form of pulses or pulse trains. This means that the electrical current is varied between zero and the selected maximum strength at intervals e.g. 1000 pulses per minute. The electrical train pulse in the apparatus/system of the present invention can range from 0 to 10,000 pulses per minute, for example from 100 to 5000 pulses per minute, or from 500 to 2000 pulses per minute, or from 700 to 1000 pulses per minute, such as 400, 500, 600, 700, 800, 900, 1000, 1100, 1200, 1300, 1400 or 1500 pulses per minute. Such a pulse will be independent of whether it is used direct current or alternating current in the device. To reinforce the deterrent effect of an electric shock by the device according to the invention there is preferably used pulses in circuits with direct current (DC), although this is not required.

As is relevant with AC electrical power as well as with electrical pulses, such alterations in the electrical power will, in organisms being sensitive to fluctuations in electrical or magnetic fields, be perceived as to be avoided, and will cause such organisms to pause or flee. A wire will, when being supplied with electrical current, form a circular magnetic field around the wire, and an electromagnet may be formed by coiling electrical wires in a helix or a spiral. Such devices may be used if organisms being sensitive to magnetic fields are to be deterred from entering a geographical area. In this respect insects and snails as well as aquatic animals (jellyfish, carbuncles, mollusks, fish) may be mentioned as organisms being sensitive to electrical and magnetic fields.

The device of the present invention comprises a plurality of conductive wires of a length which is adapted to enclose a region or object, said wires being connected to a power source of direct or alternating current. Since a shock is not perceived unless the entity touching the current-conducting wires closes a circuit (much like a switch does) or transmit power to the ground (which will also represent closing the circuit), the conductive wires in the device of the invention are in one embodiment isolated completely or partially from each other (e.g. either by being equipped with an electrically insulating material therebetween or being positioned at a distance from each other so that the electrical conducting parts of the device do not touch each other). In such an embodiment, the non-insulated parts of the electrical wires are placed so close together that the touch of a wire will automatically cause also another electrical wire to be touched simultaneously so that a current circuit is established on contact. The distance between non-insulated parts of the electrical wires may in such an embodiment lie at a distance from each other within the interval 0.5 to 10 cm, the spacing between the wires in this context representing the length of an imaginary line drawn perpendicular between two points on each wire that face each other. In such an embodiment, it will exist at least two live wires in the device.

Alternatively, in a possible embodiment there exists only an at least partially uninsulated electrical cord over a distance where the electrical circuit is closed by contact of the electrically conductive wire so that it is created a circuit between the current-carrying wire and the ground. One possible height above the ground for such wires is from ground level and higher e.g. 0 m (ground level), 0.5 cm, 1 cm, 1.5 cm, 2 cm and up to 50 m height at intervals of at least 0.5 cm, e.g. 0.5 cm, 0.75 cm, 1.0 cm, 1.05 cm, 1.30, cm, 1.40 cm and 1.50 cm. Such a height will in most cases ensure that the animals touch at least one of the electrical wires so that it completes an electrical circuit through the animal between the line and ground or between the individual wires. Assuring touching from the animal to the ground can be promoted by the ground below the bottom electrical cord being a rail of a metal that will have to be touched simultaneously as at least the lower conductive line is touched, so that there is closed a short circuit by the electrical power being passed to ground via the animal. A metal material may have sufficient free electrons available for the metal itself assuming the property of the ground, so that a connection to the ground will be unnecessary. An example of this is the power circuitry coupled to vehicles with a metal body in which the positive pole is connected directly to the vehicle's metal bodywork, and circuitry to electrically acting devices in the vehicle circuited via switches connected to the negative pole via e.g. a switch that stops the current circuit when connected to the vehicle's body.

It may also be appropriate in addition or alternatively to wet the ground beneath electrically energized power lines for to a greater extent ensuring electrical contact to the ground by the touching of at least the lower current-carrying wire and ground/ground rail beneath.

Alternatively, there may in a further possible embodiment be run two bare wires parallel to each other, where the distance between the wires and the voltage of the wires is balanced so that there will be created an electrical arcing between the wires if there is placed an electrically conductive object between the electrical wires.

The wires in the device of the invention can, in one embodiment, be placed so that the animal is deterred from entering a building, e.g. by being placed around the building's foundation, and preferably at a distance from ground level up to 50 m above the ground, although this is not intended as a limiting height and greater heights may be relevant e.g. to prevent swarms of flying insects from entering an area, for example to prevent locusts from entering into agricultural areas or to prevent swarms of wasps, ants or bees from establishing hives in selected areas during their swarming time/season.

It may also be possible in an alternative embodiment to place the electrically conducting wires at the ground level in the form of rails or a mesh or grid or netting. The electrical parts in such a device would be insulated from the connection to ground, but a connection/short-circuiting to the ground will be established when an animal steps on at least one of the current-carrying wires or the circuit is short-circuited if an animal steps on at least two current-carrying rails or wires simultaneously. In such an embodiment, the device may take the form of an electric grid in which the rail in the electrical grid is connected to a power source for conduction through the rails of the electric grid.

The conductivity of an organism is to some extent depending on the organism's content of liquid. Mammals normally have a water content between 65-90% (w/w), normally with a plurality of electrolytes such as salt ions, so that they are suitable to conduct electricity. The conductivity of electrical current in an organism is also to some extent related to the animal's surface texture or surface condition, that is, whether the animal has a dry or damp surface. An example of animals that have good initial electrical conductivity due to its nature is snails. Because snails have a relatively damp surface they will conduct electricity easily and be particularly vulnerable to electrical power. Snails are also relatively small animals, so it is consequently required quite small currents to euthanize them. An example of animals that do not have a moist surface, are insects such as ants. These animals do not conduct electricity to the same extent as snails, but they are also sensitive to electrical power because of their relatively small size and presumable their sensitivity to electrical and magnetic fields. Another example of animals that do not have a damp surface, and therefore can withstand "more" electrical power than snails and insects, is rodents such as rats and mice. These animals are also relatively much larger than snails and insects, so that they for this reason can withstand "more" electrical power. There may also be parts of an animal that are more moist than the rest of the animal's surface. An example of this is a dog's snout or nose that would normally be more humid than the rest of the dog (in dry weather) or its tongue. Touching an electrical wire with such a body part would therefore have a stronger effect than by contact with another and drier body part.

A possible consideration in the construction of the apparatus of the invention is to design it to be sufficiently physically robust that it can withstand an attack from an animal without losing its effect. Animals may react differently when they experience an electrical shock. The usual reaction in animals that are not killed off by the electrical power, but only experience it as unpleasant, is that the animal becomes afraid and flees. The more frequent the animal experiences to get a shock when approaching or touching an energized wire, the more it will normally become shy to approach this area. However, the animal may also react with aggression and anger towards the electrically energized device. If this happens at the rejection of larger animals such as wolves, bears, wild dogs, etc. the animal rises with anger and attacks the device. When attacking the animal will again experience the electric shock, which may enhance its fury, and the animal may consequently tear down and destroy the apparatus out of rage. It may therefore be beneficial to inspect the inventive device at regular intervals (for example, two to three times a week down to once a month, decided by a professional with knowledge of the animals who live in the relevant area) or the device may be equipped with an automatic alarm that alerts the user at break in the circuit (s) of the device.

Based on the above considerations, the control of current and/or voltage in the electrical circuitry of the present device may to a certain extent make it possible to decide what kind of animal that is to be rejected (and hence not killed) and the type of animals that are to be killed, where the same amperage could kill snails and insects while only seeming uncomfortable and intimidating to for example rodents (mice and rats).

Based on its body volume (and not on their surface texture), it may as a rule, be suggested that at a normal voltage of 220V, and an amperage of up to 0.01 mA could be used to kill slugs and insects, while the same current can be suitable to reject rodents. At the same voltage of 220V, a current of between 0.01 and 0.10 mA could kill small rodents (mice, rats, gophers, squirrels, etc.). A further increase of the amperage in the same voltage range, e.g. in the range from 0.10 to 15 mA, could kill large mammals such as wild dogs, hyenas, badgers, etc. In this context, snails and insects are considered as "small" animals, rodents will be considered as "medium" animals and hyenas, badgers, wild dogs, etc. will be considered "big" animals (see below).

In order to maintain supervision of the voltage and/or amperage of the present device, the device may comprise measuring means such as an ammeter and/or a voltmeter.

In the above description there has been applied relative terms such as "small", "large", "damp", "dry", etc. These phrases represent such sizes in relation to a human being, so that a "small" animal is a animal that has a weight that is 1% (w/w) or less of the average weight of a human (75 kg), a "medium" large animal is an animal with a weight within the range of 1%-30% (w/w) by weight of an average person while a "large" animal is an animal with a weight of 30% (w/w) and upward by an average human.

A material that is "dry" may have a water content within the range of 0.0%-1.0% (w/w) water, or contain water that is bound, for example. a polysaccharide or protein or biological complex may exist so that the water molecules are unable to contribute free electrons that can go into an electrical power circuit. An example of a "dry" material is a natural or synthetic material such as stone or plastic, but may also include wood that has a water content within the above range for the notion "dry".

Likewise, the term "moist" refers to a material being of natural or synthetic origin having a water content within the range from 1.0 to 15% water (w/w) in free or bound form, in which water molecules may contribute ions or having dissolved therein salts which can contribute ions that can go into an electrical circuit.

The term "wet" will refer to a natural or synthetic material having a water content of 15% (w/w) or more. In this context any biological natural tissue is "wet" (possibly apart from the skin surface which consists of dead skin cells without free water molecules or fur comprising creatine fibers without water in the structure). Supply of water to "dry" structures will of course change the situation so that the "dry" structures can change to become "moist" or "wet". For example, sweat could alter the skin's condition from being regarded as "dry" to be considered as "moist or "wet".

The term "about" shall mean that the actual size has a value that can vary within ±10% of the quoted value. For example, a current that is "about" 10.0 amperes could vary within the range from 9.0 to 11.0 amperes. Measurement accuracy in such sizes will be within the number of decimal places that occurs after the comma, or the number of decimal units in measuring the size occurring before commas. For example, the measurement accuracy for the size 10.0 amperes lie within 1.10 amperes, while the measurement accuracy for size 10.00 A will be within 1/100 amperes.

Joule is a measure designator indicating effect. A Joule is defined as a force in Newton exerted over a meter $(J={}^{(}kg \cdot M^{2)}/m^2 = N \cdot m)$.

Similarly Watt is a unit of measurement indicating the electrical power. The number corresponds to the number in Watts of Joules per unit of time $(P(W)=E(J)/t(s))$, where P is the power in Watts, E corresponds to the energy in Joules and t equals the time in seconds (s)). Based on the above general description the applied electrical power of the device of the invention will in many useful embodiments exist within the range up to 5 Joules at an electrical resistance of 500 Ohm. Since both the voltage and current should be variable in the inventive device the power consumed will also vary accordingly. However, it is not necessary to increase the effect more than necessary in each case, depending on the kind of animals to be rejected/dismissed/euthanized (large/small, sensitive to power or not, etc.) and whether it is desired to kill these animals or only deter them from entering the relevant area. A normal power consumption of a device according to the invention lies in one embodiment within the range from 0.1 to 100 Joules per km, although this is not limiting the invention. Exemplary power values for an inventive arrangement is about 1 Joule/km for an industrial area, which is not intended to kill the animal, but can go up 10-15 Joules/km or more if it is desired to kill the animals.

As previously mentioned, the device according to the invention may in one embodiment be used in sewage plants to regulate the rat population in such facilities. Another area in which a device according to the invention may be used is in one embodiment in ventilation systems where there may be placed electrical deflectors of the invention in the fan inlet or the second inlet and the air outlet to ensure that pests/vermin such as cockroaches do not enter the relevant area/the relevant building through the ventilation system.

In some areas, the use of electrical devices such as a device of the present invention, may be subject to government regulations. Without derogating from the subject matter of the invention, it will of course be a prerequisite that such local regulations are observed. The variations that exist within the scope of the invention will enable adapting the object of the invention without operating outside the scope defined by the appended claims.

An alternative location wherein the device according to the invention will be particularly effective, is within the maritime area. Salt water and sea water or generally water containing electrically charged ions, conducts electrical current well, and organisms living within such a medium is particularly susceptible to electrical shock. Thus fish such as sharks (being considered to be "small" to "large" animals depending or their species and age) or stingrays, jellyfish and other aquatic animals may be killed or deterred from entering an area by using the device according to the present invention. One embodiment of the invention will constitute electrifying the hull of a ship (if the hull is made of metal) with an electrical current as disclosed supra (e.g. being supplied in pulse trains and being of a constant or alternating nature) for preventing mollusks, seaweed, kelp, barnacles, etc. from attaching themselves to and growing on said ship's hull.

In one embodiment of the maritime variant of the invention, trains of electrical pulses of 110-40000 Volts and 0.001-0.1 amperes) are varied in square pulses with a duration of 0.1 seconds continuously through the metallic hull of a cargo ship. The expression "square pulses" refers to pulses alternating between zero volts and amperes and the maximum value of these variables increasing immediately from the lowest to the highest value and vise versa at the ending of the pulse combining to a pulse train where the duration of the zero electrification and the maximum electrification is the same. It is also possible to vary the duration between each pulse in the pulse train, and it is also possible to use both alternating and direct current in the current trains. Consequently the electrification of the system according to the invention represents in general continuously short-circuiting the relevant electrical circuit where the electrical charge is transferred to the electrically conducting object, said object being a ship's hull, an electrically conducting wire, an electrically conducting grille or screen, etc. When a pulse train is used for scaring the relevant pests away, the pulse train will as an example include a train of from two to 20 pulses in succession with a resting period of at least twice the duration between the pulses in the train, e.g. when ach pulse in the pulse train has an interval of 1 sec. between each pulse, then the duration between each train is from 2 seconds and above, e.g. 2.5-7 seconds. The number of pulses in a pulse train may be within the range of 3-50 pulses per train, e.g. 3, 5, 7, 10 or 15 pulses per pulse train.

In one embodiment of the invention there is used a condenser for building up the relevant voltage to be conducted in the circuit, and wherein a pulse is conducted from the condenser as soon as the relevant voltage has been reached. The condenser will then be discharged, and when this happens the external circuit is switched off until the condenser again has built up the voltage for firing again. The recharging and discharging of the condenser depends on the type of condenser as well as its adjustment to the task at hand. The spacing of the individual electrical pulses separately or in a pulse train, may be controlled through e.g. a relay or timer.

In analogy to the maritime embodiment disclosed supra it is in another embodiment of the invention contemplated to install electrically conducting wires into existing swage pipes. The electrically conducting wires are installed for touching or lying partially or complete electricity to objects/animals touching the sewage, e.g. rats or other types of vermin living in the sewer system. When activating the system according to the invention the rats/vermin will be subjected to the electrical current and be scared away or killed depending on the received electrical charge.

DESCRIPTION OF ACCOMPANYING DRAWINGS

Figure 4:
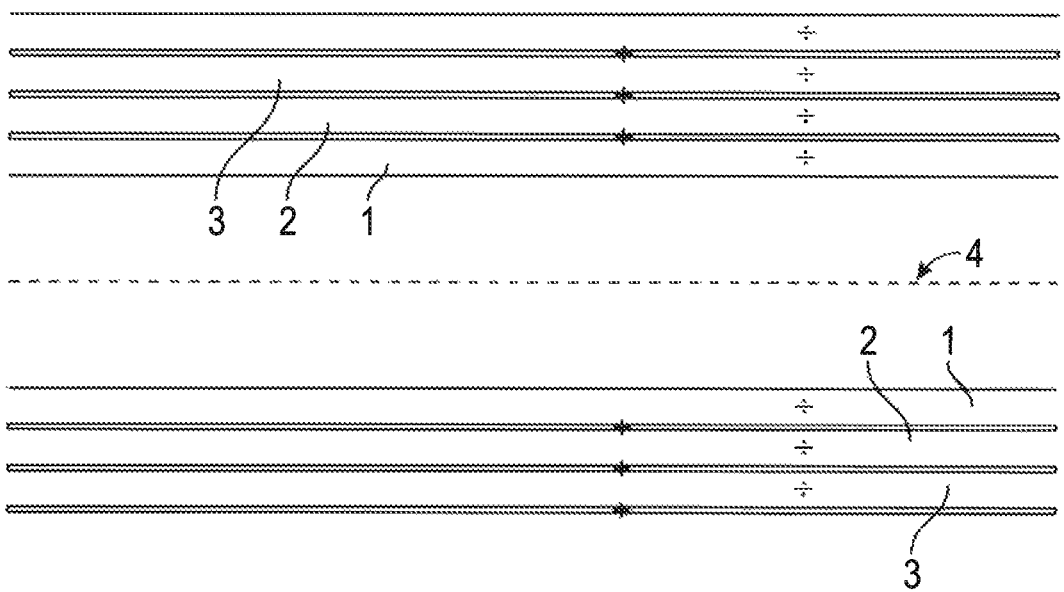

FIG. 4 shows a possible embodiment for the placement of electrical conducting cables around or in an area of runway for aircraft. Air traffic is threatened because the birds stay on landing and departure areas at airports, which also is not particularly healthy for the birds. Similarly, small rodents such as rabbits often stay and live at airports. Such animals are of interest to reject/dismiss from airport areas, both in relation to aviation safety and in terms of animal lives. It is therefore desirable to reject/dismiss animals from such areas, something which can be easily obtained with a device according to the present invention.

Figure 5:
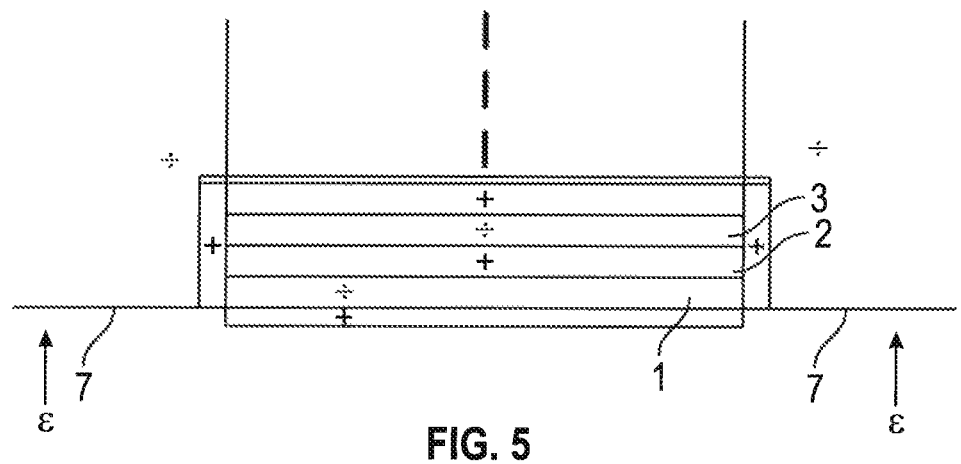

FIG. 5 shows a possible embodiment for placement of an electrically conductive grid located on traverses of a road surface to prevent farm and utility animal from moving on the roadway.

Figure 6:
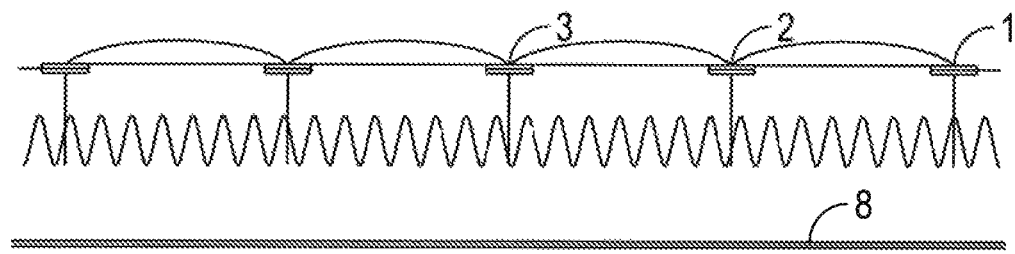

FIG. 6 shows a possible embodiment for the placement of electrical conducting cables inside a sewer for rejecting/killing vermin such as rats.

Figure 7:
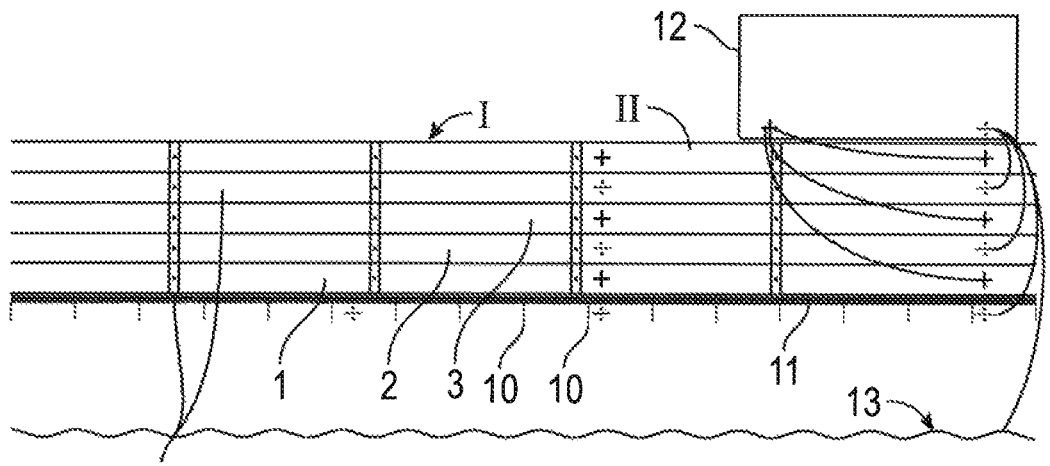

FIG. 7 shows an embodiment for forming a fence maintaining a current in the fence elements and where the fence posts are fixed into the ground and/or possibly to a fastening rail which may also be of an electrically conductive material such as metal.

Figure 8:
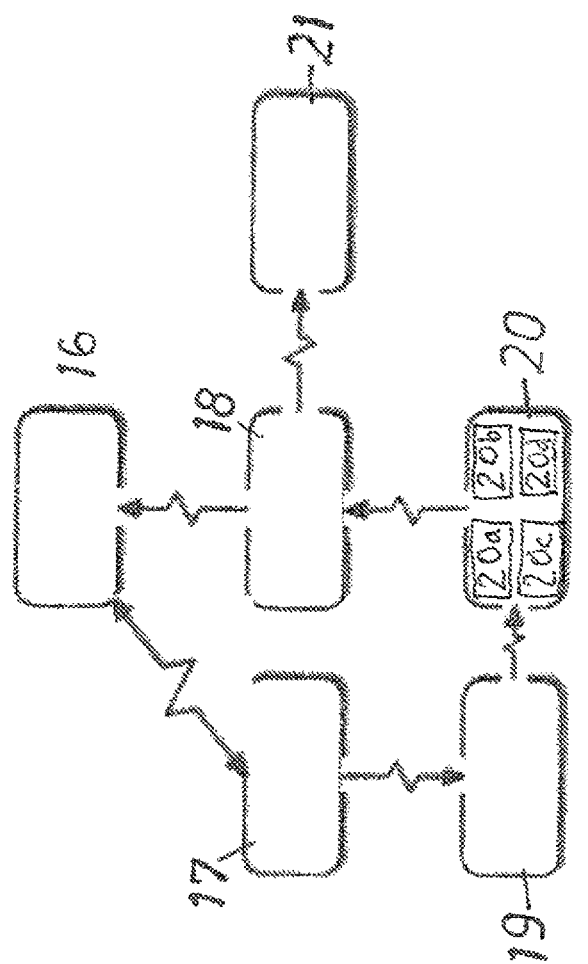

FIG. 8 shows an embodiment of a set-up scheme for an electrical wireless operation unit according to the invention.

FIGS. 9, 9a, 9b, 9c show different versions of a device using an embodiment of the apparatus according to the present invention in a system removing salmon lice from infected fish and for preventing salmon lice to enter a fish-rearing or breeding facility (net).

Figure 10:
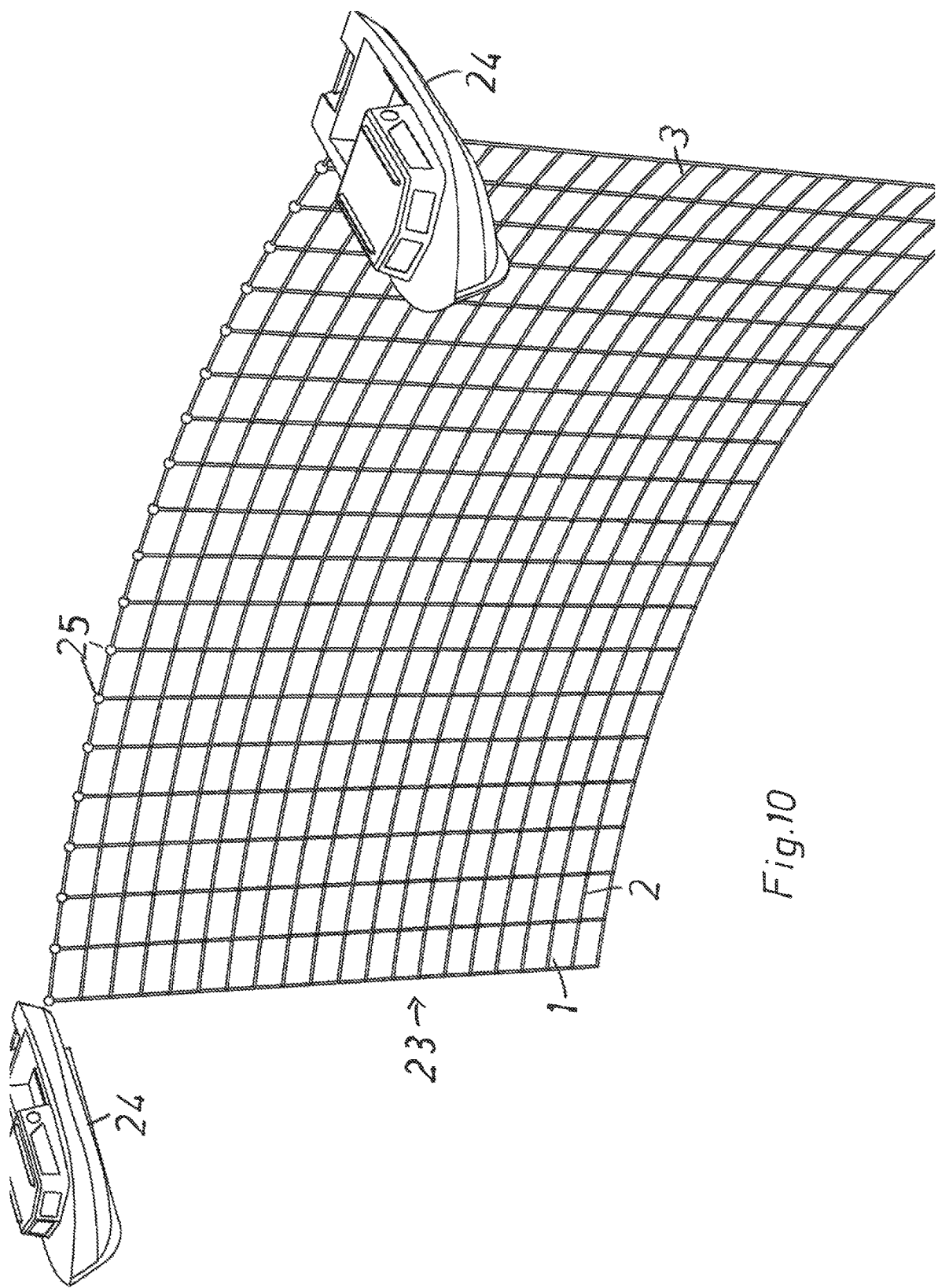

FIG. 10 shows how a device according to the present invention may be used to remove algae and jellyfish from a maritime location (e.g. bathing or recreational location, harbor, etc.), the device according to the invention being on the form of an electrified netting.

Figure 11:
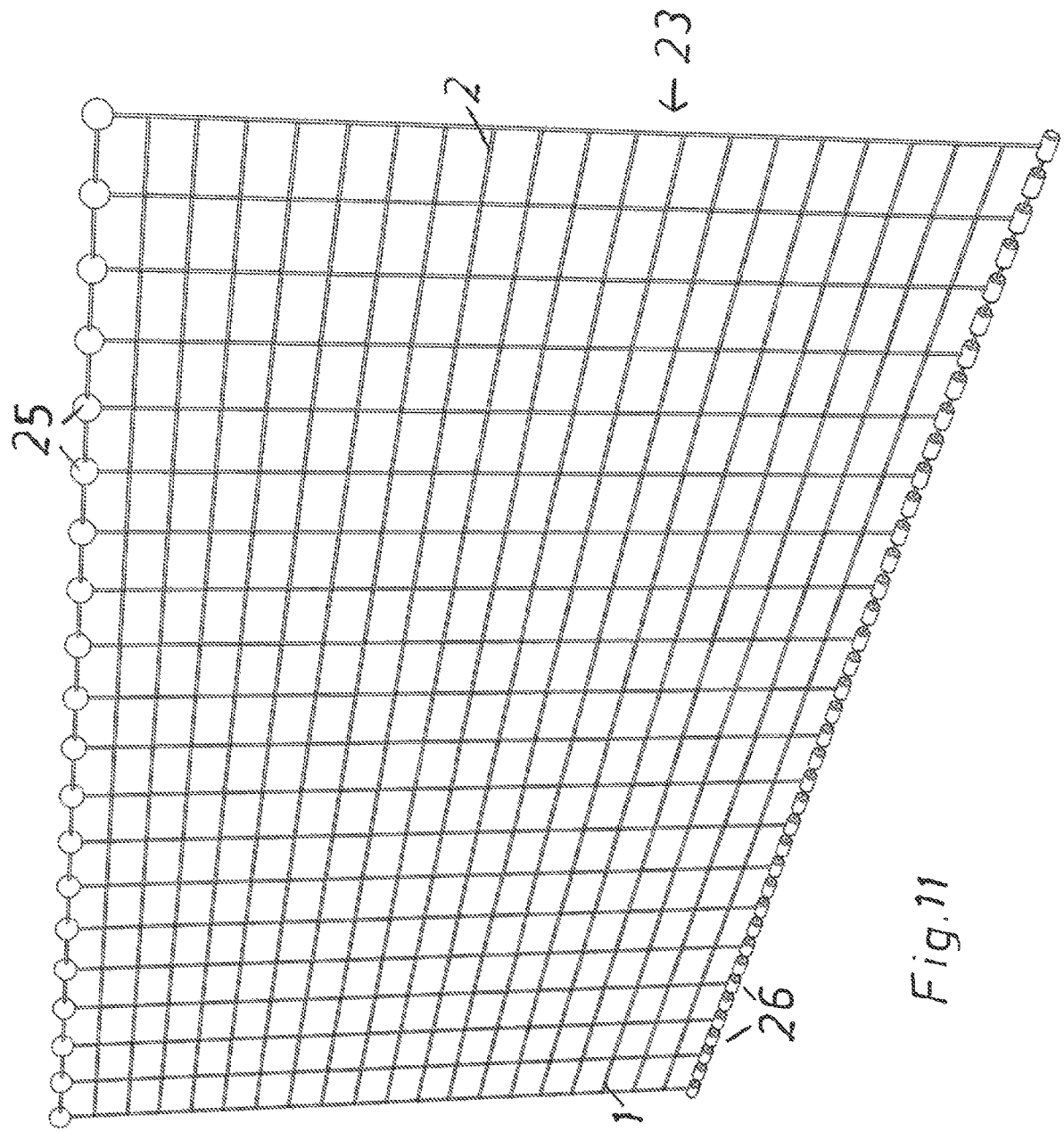

FIG. 11 shows how an embodiment of an electrified netting presented in FIG. 10.

Figure 12:
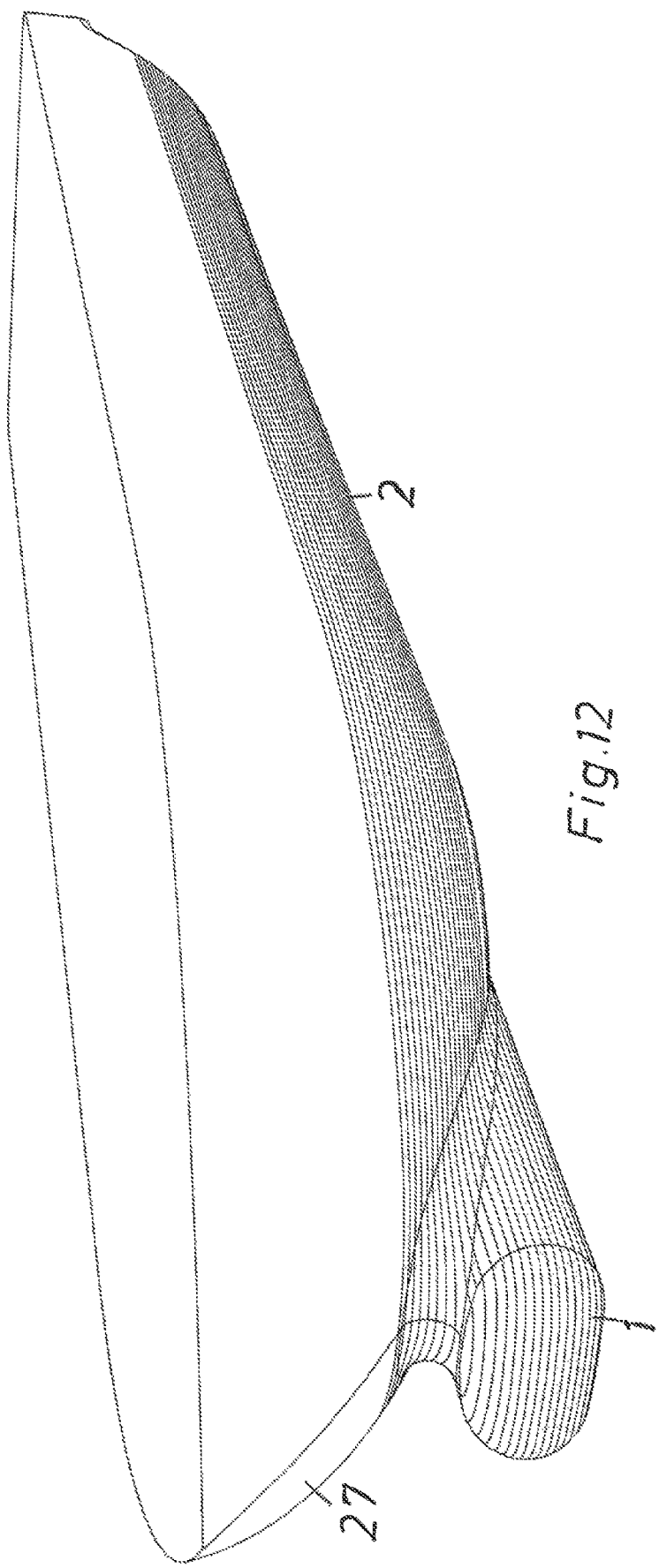

FIG. 12 shows how a device according to the present invention may be mounted on a hull of a ship.

FIG. 13 shows an embodiment of how a device according to the present invention may be used in a canoe or surfboard for scaring predators such as sharks from attacking such floating devices.

Figure 14:
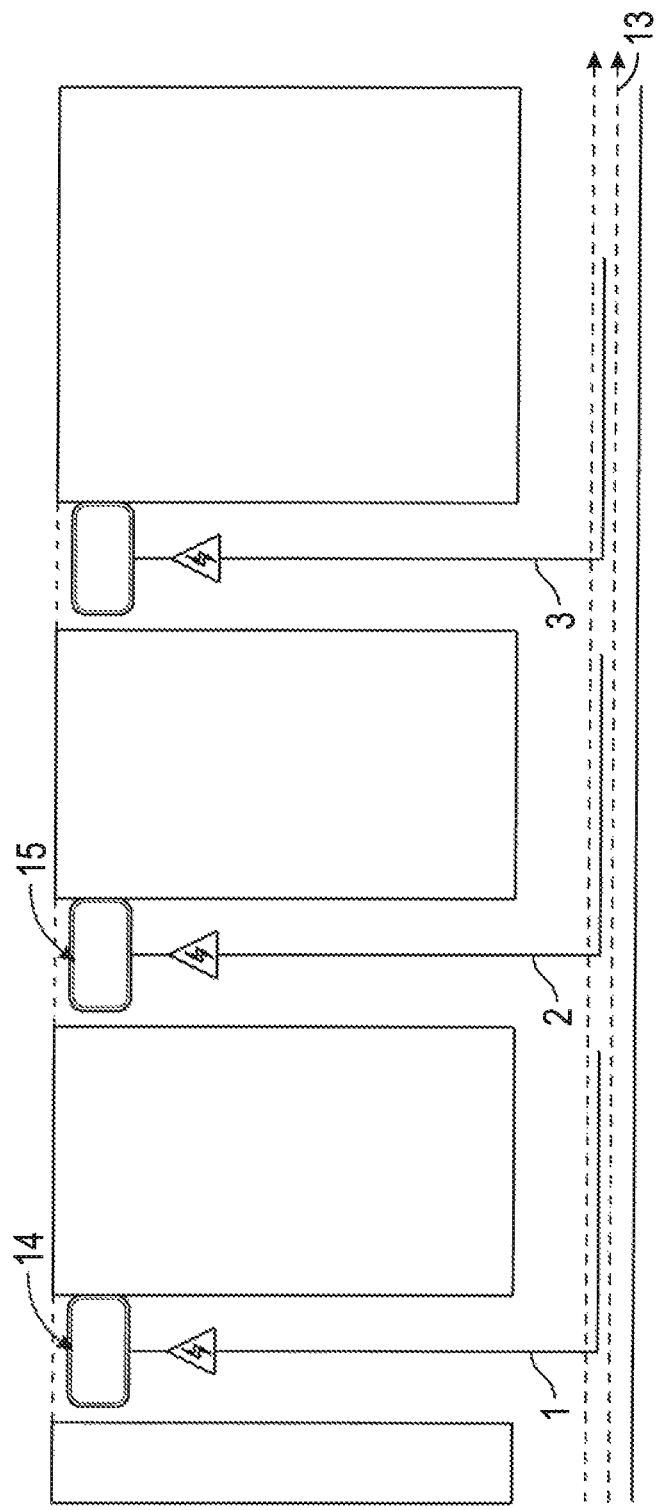

FIG. 14 shows an embodiment of how a device according to the present invention may be used for scaring/euthanizing rodents in a sewer system.

Figure 15:
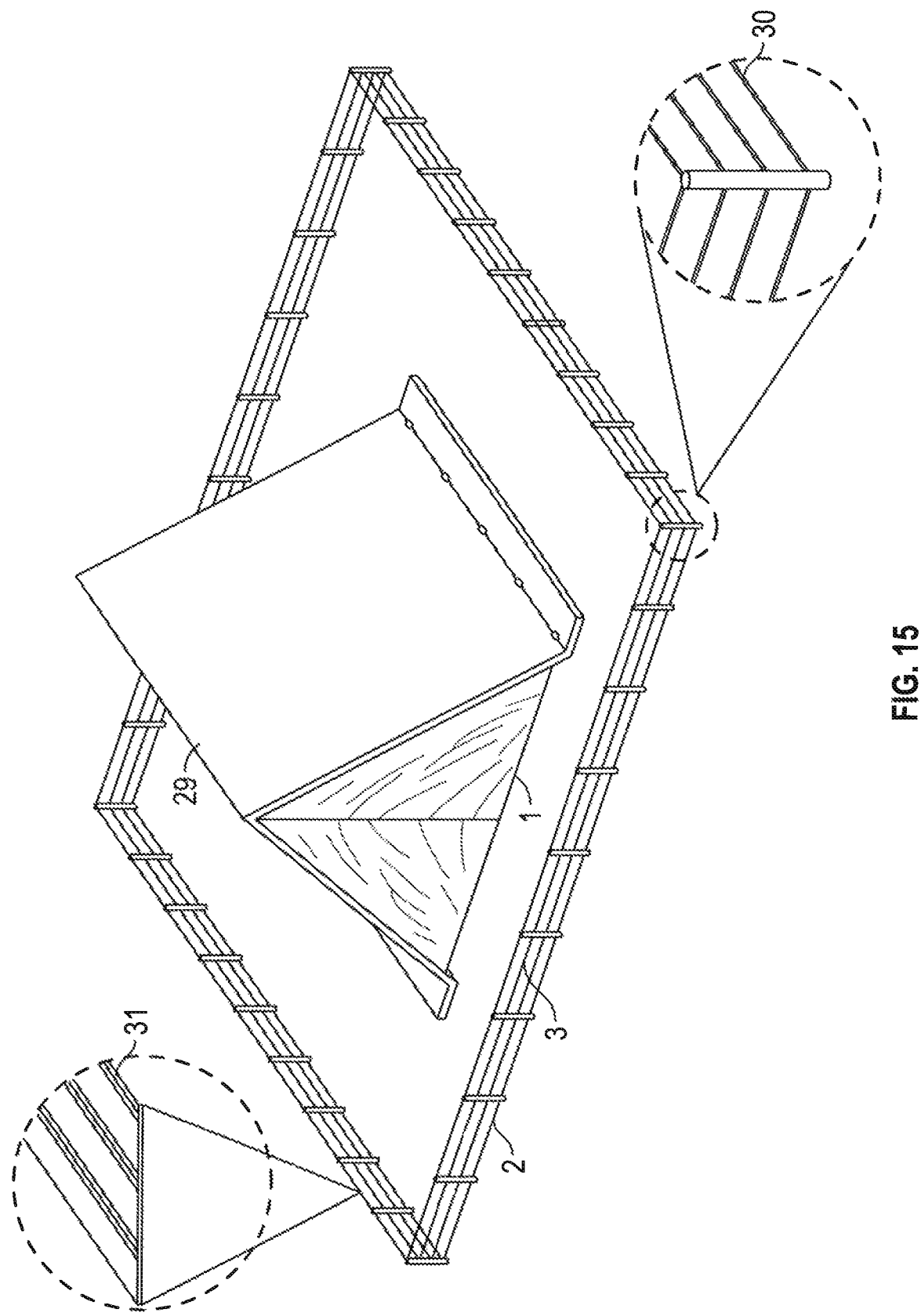

FIG. 15 shows an embodiment of how a device according to the present invention may be structured on and around a tent or a comping site.

FIG. 16 shows an embodiment of how a device according to the present invention may be mounted to a roller to be dragged after a tractor for scaring away moles and gophers from a field (e.g. corn field).

Figure 17:
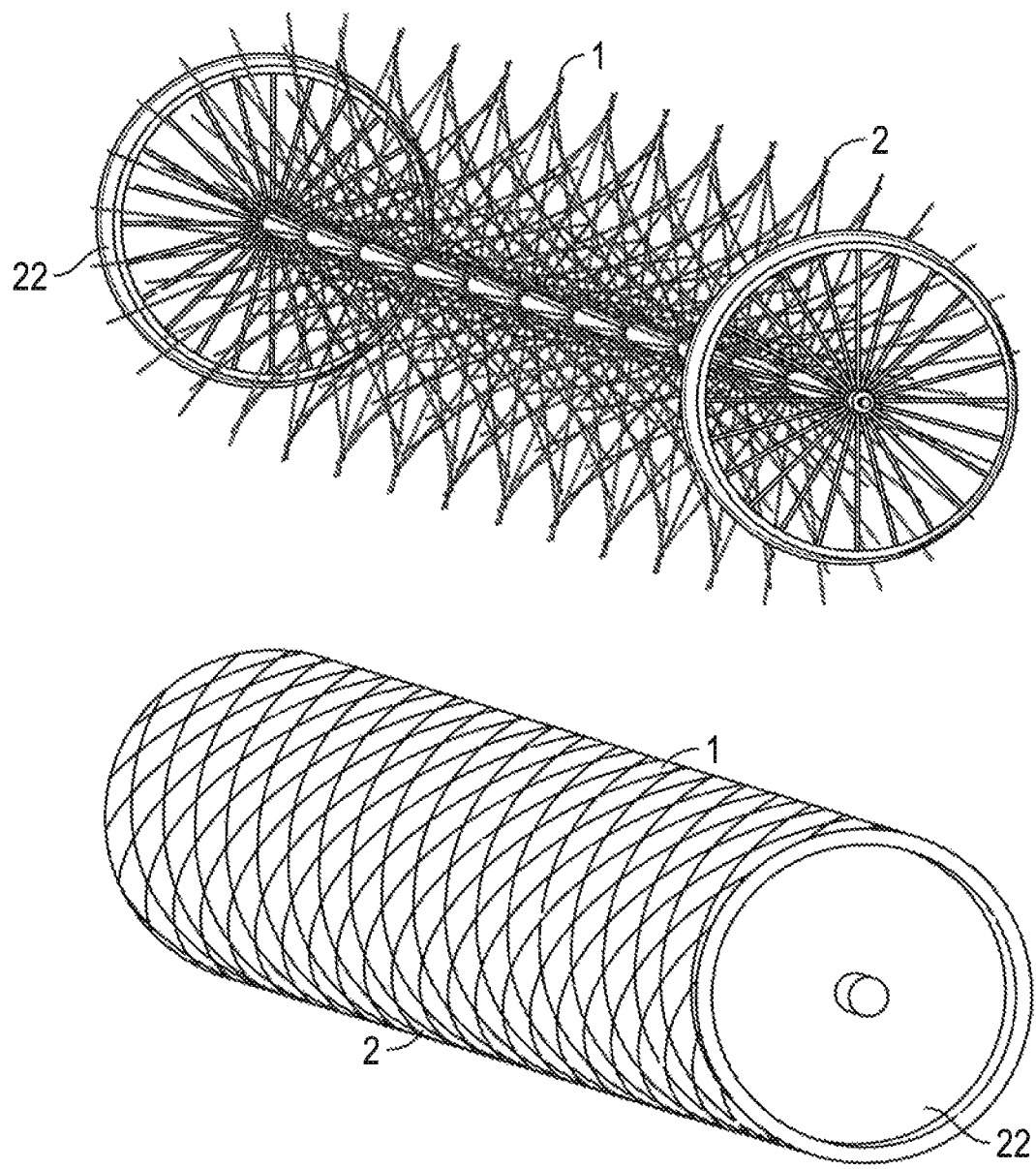

FIG. 17 shows an embodiment of how a device according to the invention may be placed around a roller shown in FIG. 16.

In all figures like reference numerals refer to like elements of the device of the invention unless something else is specifically indicated. Reference symbols + and − refers to the possible polarization of energized power lines (if DC is used). By alternating the polarization shift, so that the reference symbols + and − by AC only shows polarization in the facility at a given time.

DETAILED DESCRIPTION OF EMBODIMENTS OF THE INVENTION

Figure 1:
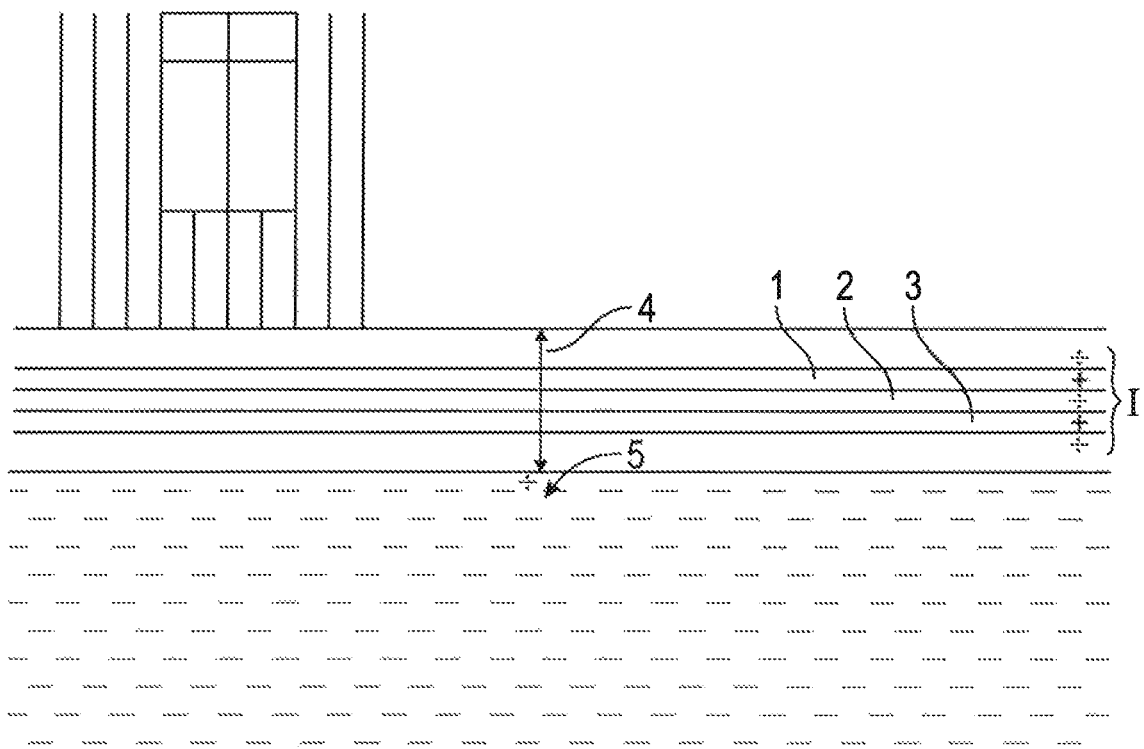
FIG. 1 shows a possible embodiment for the placement of electrical conducting cables around a house as a schematic diagram.

Example 1: This example refers to a device which is shown in FIG. 1. FIG. 1 shows a circuit (I) in one embodiment leading alternating current of 220V in lines (reference numerals 1, 2, 3), wherein the alternating current has a frequency of 60 Hz. In this circuit (I) there may be included a resistance/converter that regulates the amperage to be below 0.1 A, so that touching the wires (1, 2, 3) is not fatal to humans, but will be perceived as unpleasant to touch for humans and larger mammals. Such power would still be able to kill smaller animals such as rats, mice, snakes, insects, snails, etc. The circuit is constituted in the illustrated embodiment of three partially uninsulated conductors (1, 2, 3) which either do not touch the ground or is insulated electrically from the ground at the points where they could touch the ground (e.g. the attachment points for wires in a foundation (4)). The wires (1, 2, 3) is in this embodiment are placed to run substantially parallel to each other and at a spacing of about 2.0 cm. The distance of the ground wires from the ground (1, 2, 3) is not critical, but in the illustrated embodiment, this distance is 5 to 15 cm. In the embodiment shown in FIG. 1, the circuit may be wired in two ways, namely wherein the relevant individual touches one of the lines (1, 2, 3) while it is insulated on the ground (5) or touches the foundation (4). This will cause electrons to be running from the wire to ground (4, 5), and the individual will experience a shock. Alternatively, the individual ma touch at least two energized power lines (1, 2, 3) simultaneously, and this will also create a short-circuiting and give the individual an electrical shock. Such an experience of shock will deter individuals from approaching the area where the wires are located.

The experienced electrical impulses are perceived as a danger to rodents and other pests/insects. Animals are more sensitive to electricity than humans. If people or larger animals still bump into the product, they will get an electric shock from the device. This is neither dangerous for children/people or pets, but it will be perceived as uncomfortable. It is also possible to add protection at the front of the electrical wiring so that it reduces the risk of children and pets get an electrical shock.

Figure 2:
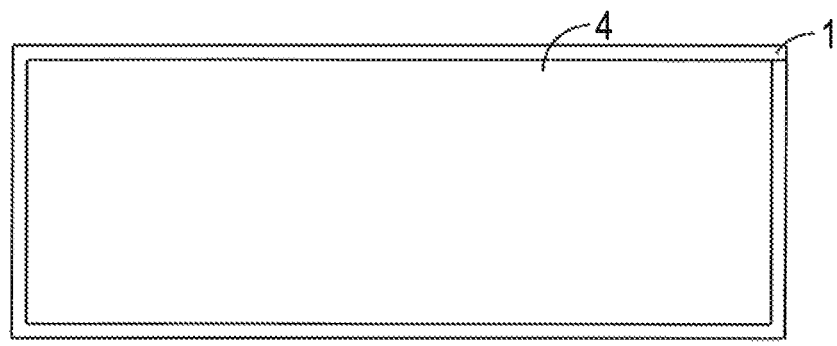
FIG. 2 shows a possible embodiment for the placement of electrical conducting cables around an open area such as a square or a pier as a schematic diagram. In one embodiment the geographical area may be a kindergarten or daycare center.

Example 2: The wiring map for live wires in the embodiment shown in this example refers to FIG. 2, but is in principle the same as the one shown in FIG. 1, namely, around a zone (4), which in this case is constituted of an outdoor area such as a square (4), but the current flowing through the wires (1') is a direct current supplied from a 12 V car battery. Energized power lines (1') in this example are comprised of grids added vertically rounded area (4). In this circuit example, it can be inserted a relay that varies the current in pulses with a pulse interval of 100 pulses per. minute when the power circuit is closed. The amperage in this example is regulated to be in the interval 100-200 mA and intended for euthanasia of small animals such as snails (slugs), insects (ants, termites) and small rodents (mice, rats), while it will only be perceived as uncomfortable and intimidating for larger animals (dogs, hyenas, bears, etc.) and people.

For both Example 1 and Example 2 it may be noted that any contact with either bare wire with electrical access to ground (4) and touch of at least two bare wires (1, 2, 3) at the same time will give an electrical shock.

Figure 3:
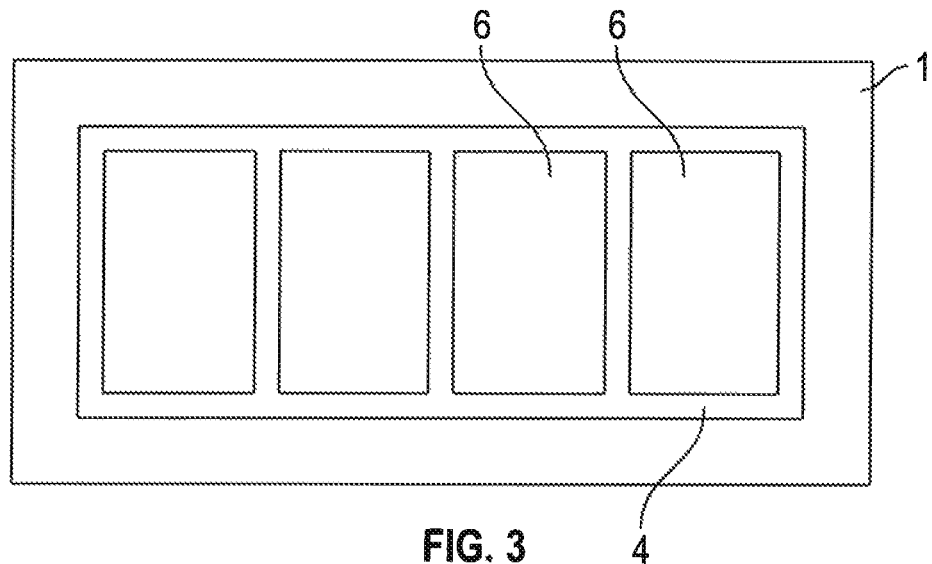
FIG. 3 shows a possible embodiment for the placement of electrical conducting cables around a compartment for storing waste such as rooms with garbage containers. This is to reject pests such as rats, foxes, raccoons, etc. from areas of edible waste.

Example 3: The wiring map for electric wires (1) is in the embodiment shown in this example the same as in examples 1 and 2, and refer to FIG. 3. In this example energized power lines (1) being netting fences or grids are driven vertically into the ground around the containers (6) to be protected against the infestation of vermin. In this example the relevant and enclosed area (4) is that of a garbage area with garbage containers (6) placed in a room. The supply of power can be made according to Example 1 or Example 2.

Example 4: This example refers to the embodiment shown in FIG. 4. The wiring map for the electric wires (1, 2, 3) in this example is shown as horizontally disposed wires that are insulated against the ground (4). The ground area (4) comprises in this example a runway for aircraft. The electrical wires (1, 2, 3) are in this embodiment placed parallel to the lengthwise direction of the airfield, but this is not required. The exposed wires (1, 2, 3) can also be replaced with an electrically conductive wire mesh. The applied current and voltage may in this example be the same as in example 1, 2 or 3.

Example 5: This example refers to the embodiment shown in FIG. 5. The power supply lines (1, 2, 3) exist in this example as conductive rails that run across a roadway. The roadway (4) can in this example be considered as earth, and the energized power lines/tracks (1, 2, 3) are isolated from this. For example, the width of the tracks (1, 2, 3) may be 3.5 cm and are where separated by a distance of 10.5 cm. Such a physical distribution of the rails 1, 2, 3 will have as a consequence that in addition it will be uncomfortable to pass the grid even without the power is turned on. To keep the animals at a location behind the tracks (1, 2, 3) they may be located on both sides of the road (4) their location may form an obstacle (7) in the form of fences, displays, or banks that prevent the animals from running towards the road (4) in areas where the grids (1, 2, 3) are located. The applied current and voltage can in this example be the same as in examples 1, 2 or 3.

It is also possible to design obstacles (7) as electric fences that are connected to electrical activators of the electrical grids (1, 2, 3). This embodiment is also intended to prevent pests from infiltrating, for example, an industrial area.

Example 6: This example refers to the embodiment shown in FIGS. 6 and 14. FIGS. 6 and 14 show a possible embodiment for the placement of electrical conducting cables inside a sewer for dismissing/killing rats. In this example the electrical wires (1, 2, 3) are located inside a sewer pipe (8) and down from each wire extends a free-hanging and uninsulated wire section 9 without these wire sections (9) touching the sewage liquid. The distance between the depending wire portions (9) is so adapted that a rat, by moving inside the sewer pipe (8) will come into contact with at least two of the hanging wires (9) simultaneously, thereby shocking the rat. The amperage and voltage that are conducted in the energized power lines (1, 2, 3, 9) is in this embodiment strong enough to kill a rat. In this embodiment, it is desirable to avoid sparks when the energized power lines (1, 2, 3, 9) are touched to avoid any ignition of explosive gases that may occur in the sewage pipe. Access to the sewage pipe (8) may be obtained through one or more manholes (14) with drain covers (15). One or each depending wire (1, 2, 3) may be connected to a control system (14) for the operation of the devices (see the legend to and explanation of FIG. 8).

Alternatively it is in such an embodiment possible to include in the sewage system fans that will remove or dilute toxic and/or explosive gases. In many older sewage systems such fans already exist. The fans may additionally be coupled or linked to gas detectors. Relevant gases may be sulphurous gases ($H_2S$, $SO_2$), alkyl gases or fumes such as methane, ethane, propane or other gases such as hydrogen, etc. When such gases are detected the electrical system according to the invention may be deactivated either manually or automatically while the possibly existing fans will be activated.

Example 7: This example refers to the embodiment shown in FIG. 7. FIG. 7 shows an embodiment for forming a fence which runs a circuit (I) for the recognized power of fence elements (II) and in which the fence is attached to the ground by means of earth rods (10) and optionally a fastening rail or bar (11) which may also be that an electrically conductive material such as metal. Attachment of the rail (11) can consist of a grounding copper rail or track surrounding the area to be secured from pests. In this example, there are, about 1 cm above the copper bar (11) located, substantially parallel to the copper track or rail (11), energized and uninsulated wires (1, 2, 3) leading pulses with alternating current at 220 V and 60 Hz and with an amperage that varies randomly between 1 and 50 mA with 120 pulse peaks every minute. This type of current can be regulated by means of a controlling box (12). When touching the grounded copper rail (11) and at least one of the conductive and non-insulated wires (1, 2, 3) simultaneously, the individual touching these wires will experience jolts of alternating current at 220 V and 60 Hz with a varying intensity over short intervals (about 2 pulse peaks every half second), which will be perceived as very unpleasant for animals that are not so small that they are killed by the electrical shock). Such an arrangement could allow the killing of snails and insects, but be deterrent to rodents and larger mammals/reptiles.

Example 8: This example refers to an alternative embodiment of the device shown in Example 6, also depicted in FIG. 13. The design of the electrical wiring is the same as shown in FIG. 6, but the power supply takes place through depending electrically conducting cords (1, 2, 3) extending into the sewage liquid 13 (shown as a wavy line in FIG. 6). The power supply will in this example be performed by current pulses or current trains with short intervals (0.5-2 sec) transmitted through the power wires or cords (1, 2, 3), for then to be turned off. This will prevent the system becoming overloaded and possible fuses from burning out. The current pulses will in this example be passed via the sewage liquid so that if a rodent such as a rat or other animal living in the sewage system comes into contact with sewage liquid, it will receive an electric shock. By sending a lethal current pulse through the device of the invention, the rats being in contact with sewage liquid and/or the electrical leads (1, 2, 3) will become euthanized. In this embodiment, there may be included several separate power plants (14), alternatively located below a drain cove of a manhole (15) so that there may be sent progressive pulses down the appropriate sewer pipe (8) by activating the adjacent power plant progressively with an activation so that one plant is turned off when another is activated. In this way, greater lengths of sewer pipes are kept free from rats (and other pests that may reside in the appropriate sewer). The number of separate power plants that can be connected is arbitrary. The pulses or pulse trains transmitted through the electrically conducting wires may be selected by the person skilled in the art and with experience of handling pest control, but can be within the range 1 to 120 pulses per minute, from 10 to 60 pulses per. minute, 10 to 40 pulses per. minutes, 30-40 pulses per minute or 50 to 60 pulses per. minutes (where the pulses have a duration as indicated above).

When using the device of the invention in plants where there may be flammable and/or explosive gases, it is desirable to include a gas meter that monitors the presence of any combustible gas. Upon detection such gas may be removed by using detectors in the actual plant being connected to blowers that can remove the combustible gas before the power is switched on to avoid any fires or explosions.

The device or system according to the present invention has been explained through the examples and the general disclosure supra. Further examples of locations where the device/system according to the present invention may be used could be the following:

In a sewer system wherein
   A short-circuit is established through the sewer fluid,
   Detectors checking the gas level are used prior to activating the system,
   A direct communication with the user of the system or equipment is established,
   The system is connected to fans already existing in the sewage system and being activated when the registered gas level rises beyond a pre-determined level,
   May be connected in series and be established in an inter-connected system and may be moved or exist permanently with a voltage of 12 V or 220 V AC or DC.

In an aquatic environment wherein
   The system is adapted to being used in the sea and being adjusted in one embodiment to reject or kill jellyfish being an increasing problem,
   Establishes a short-circuit through the water euthanizing the jellyfish and being performed by using e.g. a trawler such as a shrimp trawler,
   Alternatively for the protection of bathing beach areas where a fence is mounted under water,
   The geographical areas mentioned supra are protected from different aquatic animal species,
   Sluices for salmon lice may be established with an applied current adjusted for salmon lice.

In gardens and recreational areas such as parks, playgrounds, etc.
   The system may reject/dismiss vermin and pests from such areas thereby solving problems associated with waste and food litter being eaten by the pests/vermin, examples of relevant pests being scorpions, snakes, squirrels, rats, mice, cats, etc.

In existing buildings or buildings under construction for rejecting termites, ants such as carpenter ants, beetles, cockroaches, etc. as well as other land-dwelling pests mentioned supra such as gophers, moles, rats, mice, lemmings, etc.
   The system comprising a mesh or netting driven into the ground and including a sprinkler system for keeping the ground wet or moist for providing an improved effect to the system by increasing the electrical conductivity of the ground.

In silos or corn and grain storing facilities for preventing rats and mice from entering such facilities.

In camping and tenting locations for preventing scavengers and wild animals from entering such locations.

In boats for preventing growth or attachment of sea organisms on the boat's hull.

In private or public garbage disposal locations for preventing scavengers such as rats, mice, badgers, raccoons, etc from entering such locations.

In harbors for preventing the infestation of jellyfish, of mollusks or sea-shells, of carbuncles and other growths appearing on under-water structures in harbors an representing a potential possibility of corresponding organisms and offspring thereof to spread to vessels and boats docked at the harbor.

In one embodiment the device according to the present invention includes a strip of cloth with a width of 30 cm and of an arbitrary length, e.g. 7 m. Across the strip and in the longitudinal direction of the strip, there run five evenly spaced electrically conducting wire mesh strips with a width of 4 cm. Along each of the longitudinal edges of the cloth strip there are mounted evenly spaced eye rings for securing the strip to an object, e.g. a foundation for a building, a fence, around a garbage disposal bin or area, as an integrated part of the lower section of a tent, etc. Alternatively, the cloth strip may be secured by other means, e.g. Velcro, magnets, by securing strips, through lacing, etc. The electrically conducting strips of the cloth strip are isolated from on another and may be connected to the positive or negative pole of the relevant electrical source. It is preferred that the electrical strip located closest to the ground is connected to the positive pole of the electrical source since the ground may be considered as a source for free electrons, i.e. a negative pole, having as a consequence that animals touching the ground and the lowest electrically conducting strip or mesh simultaneously, will experience an electrical shock. By alternating the polarity of the electrically conducting strips on the cloth strip, if the animal is not daunted by this initial shock, and continues climbing the cloth strip, it will once again experience a corresponding shock when it connects the lowest and next electrically conducting strip across the cloth strip, etc. until it has reached the top of the cloth strip (presumably the animal has lost its nerve, let go of the strip and fled the location long before).

If, as an example, the cloth strip is secured to a metal fence around a storage building, a garbage disposal area, a kindergarten or daycare center, etc. and the topmost electrically conductive strip is connected to the metal fence, the metal of the fence will function as an inherent negative pole providing free electrons, and the animal will ultimately get the last electrical shock from the device according to the present invention when departing from the cloth strip.

One or both of the longitudinally running edges of the cloth strip may in an alternative embodiment, be permanently connected to a metal strip or bar providing a grounding possibility for one or both of the uttermost electrically conducting strips. The cloth strips may be combined lengthwise through clips connecting the oppositely located electrically conducting strips of the individual cloth strips to ach other.

Example 9: This example relates to placing a device according to the invention in a mouthpiece of a vacuum cleaner. In such a mouthpiece the electrically conducting wires are located around the suction opening of the mouthpiece, e.g. in concentric circles around the suction opening. By pulsing a current through the electrically conducting and non-insulated wires of the device, bugs, mites, and other vermin living or hiding in upholstery, clothing, sheets, etc. that are vacuumed will be euthanized or shocked and will more easily be removed through the vacuuming process. In such a device the current will be regulated to be lethal for the bugs/vermin but barely noticeable to humans.

Example 10: This example relates to a device for removing salmon lice from cultivated salmonides. The device comprises a number of tubes connecting at least two fish cages/nets to each other. Said tubes are equipped with brushes operating in a location in the tubes wherein a device according to the present invention is positioned for sending a current between the poles of a capacitor. The fish are ion one embodiment pumped from one fish farming net to the next one through said tubes (for gaining control of which fish that have been subjected to the device according to the invention. As explained supra, when fish (infected with salmon lice) pass between the poles of the capacitor, a spark will be passed between the poles of the capacitor on account of the reduced distance between the bodies passing the current and being provided by the fish (and the attached salmon lice) passing between said poles. When a current is passed through the fish, the salmon lice will experience an electric shock as well, and will loosen their grip on the fish. The function of the brushes is thus to remove the stunned salmon lice that have not let go of the fish in the electrocuting process. With this combined electrocuting and brushing action up to 100% of the salmon lice may be removed from the fish. It is in this example important to regulate the amperage and voltage of the current so as not to kill any significant amount of the infected fish. A loss of about 5% of the fish and less is acceptable in view of the situation that a much larger percentage of the fish would have been killed by the salmon lice over time without any treatment. It may also be possible to combine the electrical treatment of the farmed fish against salmon lice with regular chemical treatment for salmon lice. In that case the amount of the toxic substances may be reduced for removing the salmon lice.

Figure 9A:
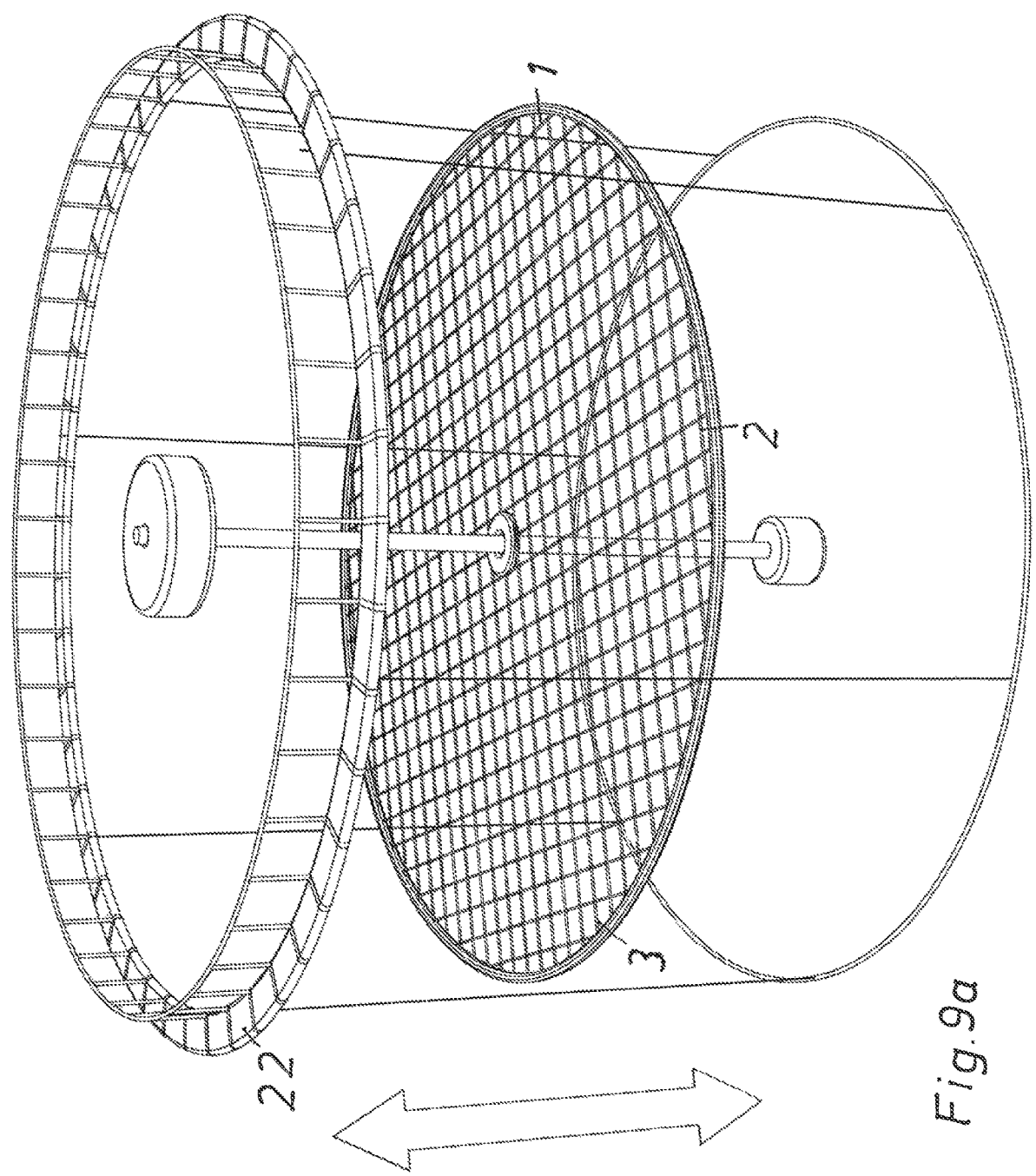
Figure 9C:
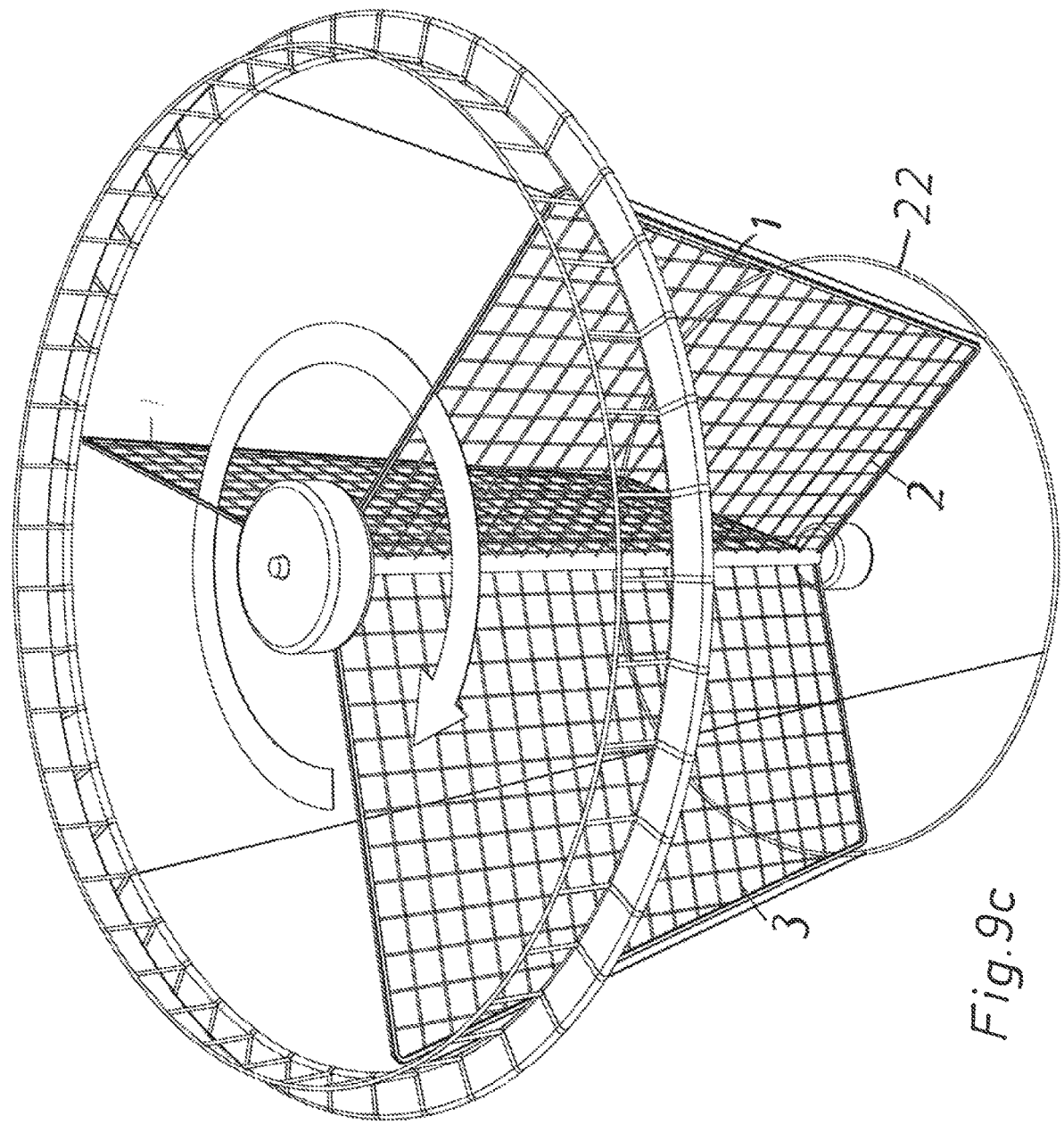

An alternative to this embodiment is shown in FIGS. 9, 9*a*, 9*b* and 9*c* showing a rearing cage or net (22) surrounded by electrically conducting wires/lines (1, 2, 3) conducting the above mentioned electrical pulses or pulse trains for discouraging salmon lice from entering the relevant rearing cage or net (22). The same structure as depicted in FIG. 9 may also be used as a temporary insert into a fish farming cage or net for discouraging salmon lice from entering the fish cultivating facility during seasonal attack times from salmon lice. In the FIGS. 9*a*, 9*b* and 9*c* the electrified grill or netting according to the invention is shown as vertically (FIG. 9*a*) or horizontally (FIG. 9*b*, 9*c*) movable or rotatable netting structures sweeping through the breeding or rearing cage or net (22). The openings in the movable or rotatable netting structure will be large enough to let fish through, but will provide an electric impulse to the fish in their passing so that possible salmon lice will be shocked and let go. In this embodiment the rearing cage (22) may be equipped with a collecting device for the released salmon lice (not shown) at its bottom.

Another embodiment and use of the device according to the present invention is shown in FIGS. 10 and 11. This embodiment shows the device according to the present invention as a netting structure (23) to be passed through the water by the aid of boats (24). The net (23) is equipped with floaters or buoyancy devices (25) as well as weights (26) at its top and bottom edges respectively, for keeping the netting 23 in a mainly vertical position in the water. This embodiment of the invention is particularly suitable for removing or rejecting sharks and jellyfish from marine areas.

Yet another embodiment of the device according to the present invention is shown in FIGS. 12 and 13. FIG. 12 shows the electrically conducting lines (1, 2) running longitudinally along the hull of a vessel or boat or surfboard (27). The electrification of the lines (1, 2) is conducted as explained supra. In the case of large boats the electrification of the lines (1, 2) may be conducted through the boat's own generator system. In the case of smaller boats such as rowing boats, canoes, kayaks, and even surfing boards, the lines (1, 2) may be electrified through the use of a battery or battery assembly (28) being connected to the electrically conducting lines (1, 2).

In FIG. 15 there is shown an embodiment of the device according to the present invention depicting an example of how to include a device according to the present invention in a tent or tent cloth (29) or parts thereof or alternatively as a fence or barrier around a tent. The electrification of the electrically conducting wires (1, 2, 3) in this embodiment may be supplied by a battery or a transportable aggregate or a solar powered electrical aggregate, etc.

Example 11: In this example a device according to the present invention is placed at the surface of a roller to be towed after a vehicle, e.g. a tractor (31). An example of such an embodiment is shown I FIG. 16 and FIG. 17. Since many animals such as insects or rodents, are sensitive to electrical discharges and electrical fields, one way to reduce the number of such organisms from a geological area, e.g. a field for cultivating food vegetables such as carrots, cabbage, cucumbers, pumpkins, etc. or decorative vegetables such as roses, tulips, carnations, etc. is to scare such pests away by at regular or irregular intervals to roll a roller provided with uninsulated electrically conducting wires at its surface for pumping electrical impulses or electrical pulse trains into the ground. In one embodiment of such a device there is used a positive charge in the wires, the anode, since the ground will represent the negative pole, the cathode, providing electrons for closing the relevant circuits. In this example it will be one of the concerns not to kill possible worms/earthworms, caterpillars or other possibly important and beneficiary animals for the relevant biotope and plants. Since rodents normally represent pests in the capacity that they eat roots of the plants, it is of interest to scare them away from geographical areas such as crop fields and not necessarily kill them.

Another way to achieve this goal is to drive electrically conducting poles into the ground in the relevant field/crop field and conduct electrical pulses as the ones explained supra, through the poles. In this way rodents such as moles or gophers will be scared away from the geographical area where the electrical pulses are noticed by the animals.

In FIG. 8 there is shown an example of a wireless unit operation system. The system comprises a control unit 16 operated by an exterminator/operator. The task of the exterminator/operator is to determine when and if the device according to the invention is to be switched on and off. The basis for such a decision is the data received from an operation data collection unit (18) and also from an on/off settings unit (17). The exterminator/operator determines inter alia the settings of the system according to the invention based on whether or not the system is to euthanize or scare the relevant organisms as well as which organisms it is likely to encounter in the relevant habitat. The on/off settings unit (17) is in communication with a go/no-go unit (19) determining automatically if the conditions for starting the system according to the invention are met (e.g. if the system according to the invention operates in a sewer system, then registering devices for flammable or explosive gases are present will make it impossible to activate the system according to the invention if such gases are present, thereby preventing possible igniting sparks to be created in the sewer system). The go/no-go unit (19) is in turn in communication with the actual electrical device according to the invention (20). The device according to the invention (20) is in communication with the operation data collection unit (18). The operation data unit (18) may also be in communication with an administrative unit (21) (e.g. keeping track of the operator's rights to use the system according to the invention based on e.g. payment of rent or history of abuse of the system, etc.). Device 20 may include an electrical current source 20a, a capacitor 20b, a voltage regulator 20c, and an amperage regulator 20d.

A device for controlling and/or euthanizing vermin or pests for preventing such vermin or pests from entering into a geographical area or into a building may comprise at least one completely or partially unisulated electrically conducting wire or conductor connected to an electrical current source, providing controlled electrical pulses to said conductor or wire in the form of pulses or pulse trains, including at least two electrically uninsulated conductors or wires. The device may comprise at least one electrical condensator/capacitor, a regulator for the voltage in the electrical circuit, and a regulator for the amperage in the electrical circuit. The device may comprise a voltmeter and/or an amperemeter. The electrically conducting wires may be located at a distance from each other within the interval up to 7 m, e.g., 0 m coinciding with the ground surface, including 0.001 m, 0.005 m, 0.010 m, 0.050 m, 0.060 m, 0.070 m, 0.080 m, 0.090 m, 0.10 m, 0.50 m, 0.70 m, 0.080 m, 0.090 , m, 0.10 m, 0.50 m, 0.70 m, 0.80 m, 0.90 m, 1.0 m, 2.0 m, 2.50 m, 3.0 m, 3.50 m, 4.0 m, 4.50 m, 5.0 m, 5.50 m, 6.0 m, 6.50, 7.0 m. The electrically conducting wire(s) may be placed at ground level.

A method for controlling the access of pests/vermin to a geographical location, building or property may comprise using the device 20, particularly with the electrically conducting wire(s) lead(s) having an electrical current with an amperage of not less than 0.0001 A. The device may use a direct current and/or a current that originates from a battery or a solar cell panel. The device may use an alternating current (AC) type (e.g., with a voltage of about 110 V, 220 V or 400 V). A frequency may be from about about 50-60 Hz. The current may be pulsed with a maximum current strength at regular intervals of up to 10,000 pulses per minute. The number of electrical pulses per minute may be in the range from 0-10, 10-20 or 30-50 pulses per minute, or from 50 to 200 pulses per minute, or from 700 to 1000 pulses per minute, such as 40, 50, 60, 70, 80, 90, 100, 110, 120, 130, 140 or 150 pulses per minute. The current may be pulsed with a pulse variation of up to 120 pulses per minute such as 1 to 120 pulses per minute, from 10 to 60 pulses per. minute, 10 to 40 pulses per. minutes, 30-40 pulses per minute or 50 to 60 pulses per. minute, wherein the pulses each have a duration of 2.8 sec. The pulses may be conducted in pulse trains wherein the pulses within a pulse train are within the range 1 to 120 pulses per minute, from 10 to 60 pulses per. minute, 10 to 40 pulses per. minutes, 30-40 pulses per minute or 50 to 60 pulses per. minute. The duration between each train may be from 2 seconds and above, e.g., 2.5-7 seconds. The number of pulses in a pulse train may be within the range of 3-50 pulses per train, e.g., 3, 5, 7, 10 or 15 pulses per pulse train.

The device 20 may be used against pests/vermin in an aquatic environment (e.g., at the surface of a hull of a sea-faring vessel, particularly in a harbor). The device 20 may be used for rejecting/killing rodents in a sewer, at a kindergarten/daycare center, in a storage building, such as a storage building for food (e.g., grain) and the like. The device 20 may be used for rejecting or dismissing pests and vermin from entering a building, wherein the electrically conducting line(s) is/are circled around a foundation of a building at a distance of not more than 3.0 m above ground level. The device may be adapted to be effective against at least one animal selected from the group of rodents (mice, rats, rabbits, etc.). ; insects (cockroaches, beetles, ants, termites, mosquitoes, moths, wasps, scorpions, grasshoppers, etc.); arachnoids ((spiders), multi-jointed, animals (centipedes), mollusks/nematodes (snails); birds (pigeons, gulls, crows, etc.); reptiles (snakes, geckos, etc.); other pests such as pine marten, weasel, raccoon, rabbits, gophers, moles, raccoons, etc. as well as animals that can attack humans such as hyenas, tigers, bears, wolves, wild boar, etc. The device 20 may be used for rejecting or dismissing pests and vermin from entering an aqueous location, wherein the electrically conducting line(s) is/are circled around the circumference of said location below water level. The device 20 may be used for rejecting, killing or dismissing pests and vermin from entering a sewer system, wherein the electrically conducting line(s) is/are depending from a girder located in at least one sewer pipe, and entering the fluid carried in the sewer pipe for providing an electric shock to any organism coming into contact with said electrically conducting line(s) or fluid or pipe.

What is claimed is:

1. A pest control system configured to inhibit pests from entering a geographical area, the system comprising:
   a first conductor that is electrically conductive and at least partially uninsulated;
   an electrical current source connected to the first conductor and comprising:
      a capacitor configured to build up and discharge electrical pulses;
      a voltage regulator configured to control a relevant voltage of the discharged electrical pulses between the first conductor and at least one of:
         a second completely or partially uninsulated electrically conducting conductor; and
         ground;
      an amperage regulator configured to control a current of the discharged electrical pulses;
      the current source configured to provide a plurality of pulse trains to the first conductor, each pulse train comprising a plurality of the discharged electrical pulses separated by a duration of time between each pulse, sequential pulse trains separated by a resting period between the pulse trains, wherein:
         the relevant voltage is between 400 and 50,000 volts;
         the current is under 100 mA; and
         a number of pulses per minute does not exceed 10,000;
   a control unit coupled to the current source and configured to receive system settings for the current source;
   a data collection unit coupled to the control unit and configured to collect operation data associated with the system;
   a go/no-go unit coupled to the control unit and configured to determine if starting conditions for the system are met; and
   an on/off unit coupled to the control unit and the go/no-go unit and configured to turn the system on or off in response to the go/no-go unit.

2. The pest control system of claim 1, wherein the current source is further configured to vary the duration of time between each pulse in a respective pulse train.

3. The pest control system of claim 1, wherein the current source is further configured to switch off the current during the duration of time between each pulse, and the capacitor is configured to build up the relevant voltage for firing again during the duration of time.

4. The pest control system of claim 1, wherein the number of pulses per minute does not exceed 120.

5. The pest control system of claim 1, further comprising a strip of cloth having a plurality of securing means for securing the cloth to an object, wherein the first conductor is disposed in a longitudinal direction along the strip of cloth.

6. The pest control system of claim 1, wherein:
   the number of pulses per minute is below 10, and
   the relevant voltage is several thousand volts.

7. The pest control system of claim 1, wherein:
   the number of pulses per minute is from 10 to 60, and
   the duration of time between pulse trains is from 2.5 to 7 seconds.

8. The pest control system of claim 1, wherein the current is between 0.01 and 0.1 mA.

9. The pest control system of claim 1, wherein the resting period between sequential pulse trains is at least twice the duration of time between the adjacent pulses within the pulse trains.

* * * * *